United States Patent
Hoshida et al.

(10) Patent No.: US 7,907,324 B2
(45) Date of Patent: Mar. 15, 2011

(54) OPTICAL MODULATOR AND CONTROLLING METHOD AND APPARATUS THEREOF

(75) Inventors: Takeshi Hoshida, Kawasaki (JP); Yuichi Akiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 324 days.

(21) Appl. No.: 12/292,471

(22) Filed: Nov. 19, 2008

(65) Prior Publication Data

US 2009/0244685 A1 Oct. 1, 2009

(30) Foreign Application Priority Data

Mar. 31, 2008 (JP) ................. 2008-092463

(51) Int. Cl.
*G02F 1/01* (2006.01)
*G02B 26/00* (2006.01)
(52) U.S. Cl. .............. 359/279; 359/239; 359/289
(58) Field of Classification Search .......... 359/278–279, 359/315, 245, 247, 251–252, 254, 108, 237–238, 359/290–292, 298, 300–302; 385/1–3, 40, 385/129–132, 5, 8–9
See application file for complete search history.

(56) References Cited

U.S. PATENT DOCUMENTS

2008/0239448 A1* 10/2008 Tanaka et al. ............ 359/245
2010/0202785 A1* 8/2010 Kawanishi et al. ........ 398/185

FOREIGN PATENT DOCUMENTS

WO 03/049333 A1 6/2003

OTHER PUBLICATIONS

Seimetz M. et al. "Optical Systems With High-Order DPSK and Star QAM Modulation Based on Interferometric Direct Detection", Journal of Lightwave Technology, IEEE Service Center, New York, NY, US., vol. 25, No. 6, Jun. 2007, pp. 1515-1530.
European Search Report mailed Jul. 2, 2009 and issued in corresponding European Patent Application 08020473.8.
T. Sakamoto, A. Chiba and T. Kawanishi, "50 Gb/s 16 QAM by a quad-parallel Mach-Zehnder modulator", ECOC 2007, PD2.8 (2 pages).

* cited by examiner

*Primary Examiner* — Ricky L Mack
*Assistant Examiner* — Dawayne A Pinkney
(74) *Attorney, Agent, or Firm* — Staas & Halsey LLP

(57) ABSTRACT

The optical modulator branches an input light into (2×N) lights in an optical branching section, and then phase modulates each of the branched lights in (2×N) phase modulating sections, and couples the phase modulated lights in an optical coupling section and generates a quadrature amplitude modulated (QAM) signal light having a $4^N$ value. At this time, a relative difference of optical phases of the phase modulated lights is variably adjusted by an optical phase adjusting section. Moreover, a power ratio of the phase modulated lights is variably adjusted with an optical power adjusting section. As a result, it is possible to output $4^N$ QAM signal light, with good signal quality.

31 Claims, 15 Drawing Sheets

CONSTELLATION OF 64 QAM SIGNAL LIGHT

16 QAM CONSTELLATION
IN IDEAL STATE

WHEN PHASE DEVIATES
AT THE TIME OF COUPLING
OUTPUTS OF RESPECTIVE
MODULATORS

16 QAM CONSTELLATION
IN IDEAL STATE

WHEN OPTICAL POWER
RATIO IS LARGER THAN 1:4

WHEN OPTICAL POWER
RATIO IS SMALLER THAN 1:4

OPTICAL MODULATOR AND CONTROLLING METHOD AND APPARATUS THEREOF

CROSS-REFERENCE TO RELATED APPLICATION

This application is based upon and claims the benefit of priority of the prior Japanese Patent Application No. 2008-092463, filed on Mar. 31, 2008, the entire contents of which are incorporated herein by reference.

FIELD

The present invention relates to a modulation technique in an optical communication field, and in particular relates to an optical modulator that modulates light by using a quadrature amplitude modulation (QAM) system, a controlling method and a controlling apparatus thereof, and an optical transmitter and an optical transmission system.

BACKGROUND

Recently, in order to perform wavelength multiplexing transmission of a signal light with a speed as high as 40 gigabits per second (Gbps) and 100 Gbps at high density, investigations have been actively made of an optical modulation system having a high spectral density. Moreover, since vigorous research and development of coherent reception techniques have been made, realization of a receiver applying a 16 QAM system, which is a multilevel modulation system using more multilevels than a differential quadrature phase shift keying (DQPSK) system that has heretofore come into practical use, becomes realistic, and investigations thereof have been made.

Under such a background, recently, as one form of the optical modulator according to the 16 QAM system, a configuration has been proposed in which two QPSK modulators are connected in parallel and the signal lights modulated by respective QPSK modulators are multiplexed so that a power ratio thereof becomes 4:1, (for example, refer to T. Sakamoto, A. Chiba and T. Kawanishi, "50-Gb/s 16 QAM by a quad-parallel Mach-Zehnder modulator", ECOC 2007, PD2.8).

Incidentally, regarding the configuration of the optical modulator according to the 16 QAM system, a phase difference at the time of multiplexing output lights from the two QPSK modulators may deviate from an ideal value of n×90° (n is an integer) due to individual differences of the QPSK modulators, DC drift, wavelength dependency, temperature dependency, deterioration with age or the like. Moreover, the power ratio of a component modulated by each QPSK modulator occupying the output light may deviate from the ideal value of 4:1 due to individual differences of the QPSK modulators, wavelength dependency, temperature dependency, deterioration with age or the like.

Specifically, FIG. 25 is a diagram schematically illustrating an aspect where a constellation of a 16 QAM signal light (expressing a relation between phase difference and amplitude for each symbol in a rectangular coordinate system, with an in-phase component I being plotted on the horizontal axis and a quadrature component Q being plotted on the vertical axis) is changing due to a deviation of the phase difference in the output light of the respective QPSK modulators. Respective symbols (black dots in the drawing) of the 16 QAM signal light are in an arrangement as illustrated in the upper part of FIG. 25 when the phase difference is in the ideal state (n×90°), where distances between respective symbols become equal. On the other hand, when the phase difference deviates from the ideal state, as illustrated in the lower part of FIG. 25, the arrangement of the respective symbols rotates about a central point of four symbols in each of the first to the fourth quadrants. Actually, rotation about an origin of the rectangular coordinate system can occur as well. However regarding this, by rotating the coordinate system itself and redefining it, the constellation state can be sufficiently expressed without impairing generality. Therefore, rotation about the origin is not considered here.

Moreover FIG. 26 is a diagram schematically illustrating an aspect where the constellation of the 16 QAM signal light is changing due to a deviation of the power ratio of the component modulated by each QPSK modulator and occupying the output light. When the power ratio is in the ideal state (4:1), respective symbols of the 16 QAM signal light are in the arrangement as illustrated in the upper part of FIG. 26, where the distances between respective symbols become equal. On the other hand, when the power ratio is larger than 4:1, as illustrated in the middle part of FIG. 26, a gap between the four symbols in the first to the fourth quadrants becomes narrow. Moreover, when the power ratio is smaller than 4:1, as illustrated in the lower part of FIG. 26, the gap between the four symbols in the first to the fourth quadrants becomes wide.

When a change occurs in the symbol arrangement of the 16 QAM signal light due to a deviation from the ideal state of the phase difference or the power ratio of the output light of the respective QPSK modulators as described above, the distances between respective symbols are not equal. Therefore, the receiver compatible with the 16 QAM system may not operate correctly, and it is assumed that an error tends to occur in the receiver, influenced by noise light.

However, a technique for monitoring the deviation of the phase difference and the deviation of the power ratio between phase modulated lights, multiplexed in the optical modulator according to the 16 QAM system as described above, has not yet been proposed. Moreover, a specific technique teaching how to adjust the deviation and stabilize the modulator in the ideal state has not yet been proposed.

SUMMARY

According to an aspect of the invention provides an optical modulator that performs quadrature amplitude modulation with respect to an input light and outputs the quadrature amplitude modulated light. One form of the optical modulator comprises: an optical branching section that branches an input light into (2×N) lights (where N is an integer equal to or larger than 2); (2×N) phase modulating sections that respectively modulate the phase of respective lights branched by the optical branching section; an optical coupling section that couples the phase-modulated lights output from the respective phase modulating sections and outputs quadrature amplitude modulated signal light having a $4^N$ value; and an optical phase adjusting section that relatively adjusts, with respect to an optical phase of specific two phase-modulated lights of the phase-modulated lights output from the respective phase modulating sections, the optical phase of the remaining (2×N−2) phase-modulated lights.

Another aspect of the optical modulator comprises: an optical branching section that branches an input light into (2×N) lights (where N is an integer equal to or larger than 2); (2×N) phase modulating sections that respectively modulate the phase of respective lights branched by the optical branching section; an optical coupling section that couples the phase-modulated lights output from the respective phase modulating sections and outputs quadrature amplitude modulated signal light having a $4^N$ value; and an optical power adjusting section that adjusts a ratio of the power of specific two phase-modulated lights, of the phase-modulated lights output from the respective phase modulating sections, with respect to the power of the quadrature amplitude modulated signal light having a $4^N$ value output from the optical coupling section.

In the above described optical modulators, a relative difference in respective optical phases of the phase-modulated lights coupled by the optical coupling section can be variably adjusted by the optical phase adjusting section. Moreover, the power ratio of the phase-modulated light coupled by the optical coupling section can be variably adjusted by the optical power adjusting section. Accordingly, a high-quality quadrature amplitude modulated signal light having a $4^N$ value can be output, with the above described deviation of the phase difference or the power ratio from the ideal state being corrected.

Additional objects and advantages of the invention will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF EMBODIMENTS

A configuration for executing the present invention will be described, with reference to the appended drawings. Throughout all the figures, the same reference symbols denote the same or equivalent parts.

Figure 1:
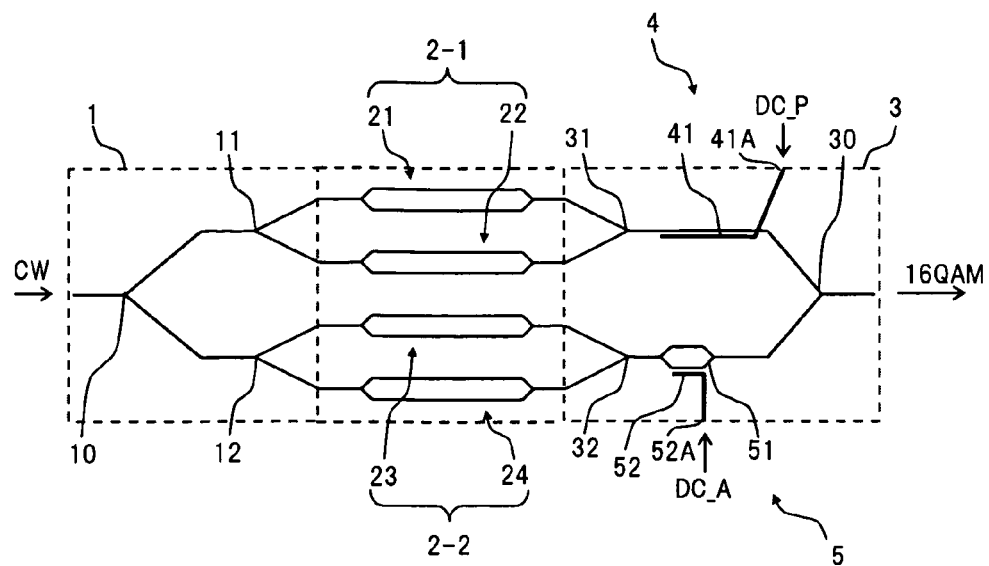
FIG. 1 is a diagram showing a main configuration in an embodiment of an optical modulator according to the present invention.

FIG. 1 is a diagram showing a main configuration of an optical modulator in an embodiment of the present invention.

In FIG. 1, the optical modulator in the embodiment includes: an optical branching section 1 that branches continuous light (CW) or an optical pulse train supplied from outside into four lights; first to fourth phase modulating sections 21, 22, 23 and 24 respectively connected to each output port of the optical branching section 1; an optical coupling section 3 that couples lights respectively output from the respective phase modulating sections 21 to 24 into a set of two and generates a first coupled light and a second coupled light, and also couples the respective coupled lights into one and generates a 16 QAM signal light; an optical phase adjusting section 4 that variably adjusts at least one optical phase of the first and the second coupled lights in the optical coupling section 3; and an optical power adjusting section 5 that variably adjusts at least one optical power of the first and the second coupled lights.

The optical branching section 1 branches the continuous light or the optical pulse train provided to an input port into two lights at an optical branching point 10 with a required power ratio (here, 1:1). Moreover, the optical branching section 1 branches the respective lights branched into two lights at the optical branching point 10 into two lights at optical branding points 11 and 12 respectively with a power ratio of 1:1. For the optical branching section 1, for example, a general 1×4 splitter can be used. The power ratio of 1:1 (50%: 50%) is an ideal value, but the light may be branched with a power ratio of around 60%:40% due to manufacturing errors or the like.

The respective phase modulating sections 21 to 24 each perform a binary phase modulation (binary phase shift keying (BPSK)) with respect to the respective lights branched by the optical branching section 1 and output the lights. As a specific example of the respective phase modulating sections 21 to 24, a Mach-Zhender modulator (MZM) in which a Mach-Zhender (MZ) interferometer-type optical waveguide is formed on a substrate material having an electro-optic effect such as lithium niobate ($LiNbO_3$:LN) and a signal electrode is provided along a branch arm of the MZ interferometer to modulate a phase of a guided wave can be used. In FIG. 1, to make the configuration clearly understandable, only an optical waveguide pattern of the MZM used for the respective phase modulating sections 21 to 24 is shown, and illustration of a signal electrode and the like is omitted. Here the four phase modulating sections 21 to 24 connected in parallel are divided into a first phase modulation group 2-1 in which the phase modulating sections 21 and 22 on the first and the second stages in FIG. 1 are designated as a pair, and a second phase modulation group 2-2 in which the phase modulating sections 23 and 24 on the third and the fourth stages are designated as a pair. The operation of the first and the second phase modulation groups 2-1 and 2-2 is set so that phase shifts of a carrier wave in the respective paired phase modulating sections 21 and 22, and 23 and 24 are orthogonal to each other. Moreover a −6 dB fixed optical attenuator (not shown) is arranged on an optical path on the second phase modulation group 2-2 side or an optical attenuation of −6 dB is provided in the optical power adjusting section 5 described later, so that the power of the phase modulated light on the second phase modulation group 2-2 side becomes 1/4 with respect to the power of the phase modulated light on the first phase modulation group 2-1 side. The power ratio of 1/4 is an ideal value, but actually, the power ratio may become 1/5 or 1/3 due to manufacturing errors or the like.

The optical coupling section 3 couples the input light to each input port connected to the phase modulating sections 21 and 22 of the four input ports with a power ratio of 1:1 at an optical coupling point 31 to generate the first coupled light. Moreover the optical coupling section 3 couples the input light to each input port connected to the phase modulating sections 23 and 24 of the four input ports with the power ratio of 1:1 at an optical coupling point 32 to generate the second coupled light. Furthermore the optical coupling section 3 couples the first and the second coupled lights with a required power ratio (here, 1:1) at an optical coupling point 30 to generate a 16 QAM signal light, and outputs the 16 QAM signal light from the output port to the outside. For the optical coupling section 3, for example, a general 4×1 combiner can be used. Here it is assumed that the optical coupling section 3 is constructed by forming the optical waveguide having a pattern as shown in the drawing on the substrate material having the electro-optic effect.

In the optical phase adjusting section 4, for example, an electrode 41 is formed along the optical path positioned between the optical coupling points 31 and 30 of the optical coupling section 3, and a bias voltage for adjusting the phase difference (hereinafter, referred to as "phase difference adjusting voltage") DC_P is applied to an adjusting terminal 41A formed by extending one end of the electrode 41 to the substrate edge, to thereby change the optical phase of the first coupled light. The optical phase adjusting section 4 can variably adjust a relative difference in the respective optical phases of the first and the second coupled lights, thereby enabling to correct the aforementioned deviation from an ideal state of n×90°. How the ideal state can be realized by controlling the phase difference adjusting voltage DC_P to be provided to the electrode 41, will be explained later in detail.

In the optical power adjusting section 5, for example, an MZ interferometer 51 is formed on the optical path positioned between the optical coupling points 32 and 30 of the optical coupling section 3, and an electrode 52 is provided along one branch arm of the MZ interferometer 51, to apply a bias voltage for adjusting the power ratio (hereinafter, referred to as "power ratio adjusting voltage") DC_A to an adjusting terminal 52A formed by extending one end of the electrode 52 to the substrate edge, to thereby change an optical attenuation (loss) in the MZ interferometer 51. In the example of FIG. 1, arrangement of the electrode corresponding to a Z cut substrate is shown, however, the present invention is not limited to the Z cut, and the same function can be realized by appropriately arranging the electrode corresponding to a cut direction of the substrate. The optical power adjusting section 5 can variably adjust the power ratio of the first and the second coupled lights, thereby enabling to correct a deviation from the aforementioned ideal state of 4:1. However, depending on the design of the electrode 52 in the MZ interferometer 51, if the optical attenuation is adjusted by the power ratio adjusting voltage DC_A, the phase of the output light may be rotated. Therefore, extra attention is required. In this case, a measure where after the optical attenuation is adjusted, the phase is readjusted, is effective. How the ideal state can be realized by controlling the power ratio adjusting voltage DC_A to be provided to the electrode 52 will be explained later in detail.

In the configuration example of the optical power adjusting section 5, a variable optical attenuator using the MZ interferometer is applied. However, a configuration where an optical absorption area is provided, and an absorption ratio thereof is controlled by voltage or current can be applied as an alternative configuration of the variable optical attenuator. Specifically, for example, a PN junction of a semiconductor material having an appropriate band gap with respect to the wavelength is provided on the waveguide or in the vicinity thereof, to adjust a reverse bias voltage of the PN junction. As a result, for example, an absorption coefficient can be made variable by a Franz-Keldysh effect or a quantum confined Stark effect (QCSE).

Moreover a variable optical amplifier can be applied instead of the variable optical attenuator. Specifically, for example, a semiconductor optical amplifier (SOA) area may be provided on the waveguide, and an injection current to the area can be controlled to variably adjust a gain thereof. Alternatively, a rare earth ion such as erbium may be doped into the waveguide core or in the vicinity thereof, and the power of the pump light which pumps the rare earth ion can be controlled to variably adjust the gain thereof.

Figure 2:
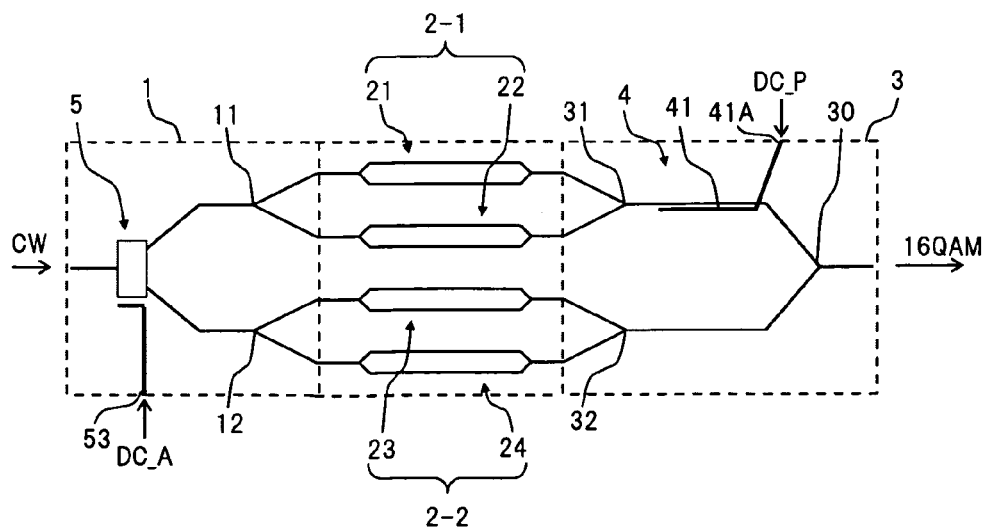
FIG. 2 is a diagram showing a main configuration when a branching ratio is made variable to realize an optical power adjusting section in the embodiment.

Moreover, for example as shown in FIG. 2, the optical power adjusting section 5 can also be realized by making a branching ratio variable at the optical branching point 10 in the optical branching section 1, other than by providing the aforementioned variable optical attenuator or the variable optical amplifier. Specifically, for example, the branching ratio can be changed by applying an optical device such as a multi mode interference (MMI) coupler, in which a power branching ratio is variable, which is well-known in J. Leuthold C. H. Joyner, "Multimode interference couplers with tunable power splitting ratios," Journal of Lightwave Technology, vol. 19, no. 5, pp. 700-707, May 2001, or a directional coupler to the optical branching point 10, and applying the power ratio adjusting voltage DC_A to an adjusting terminal 53 of the optical device. As a result, the aforementioned power ratio of the first and the second coupled lights can be variably adjusted and a deviation from the ideal state can be corrected. Such a configuration is advantageous in miniaturization of the optical modulator as compared to the configuration of FIG. 1. Here one example for making the branching ratio variable at the optical branching point 10 in the optical branching section 1 has been described, however, even if the coupling ratio at the optical coupling point 30 in the optical coupling section 3 is made variable, the same operation and effect can be obtained.

The aforementioned optical phase adjusting section 4 and optical power adjusting section 5 can be variously changed, taking into consideration a combination of the optical phase adjusting section 4 and the optical power adjusting section 5 and combinations thereof with other components of the optical modulator. Modification examples involved with the configuration of FIG. 1 or FIG. 2 are enumerated below.

Figure 3:
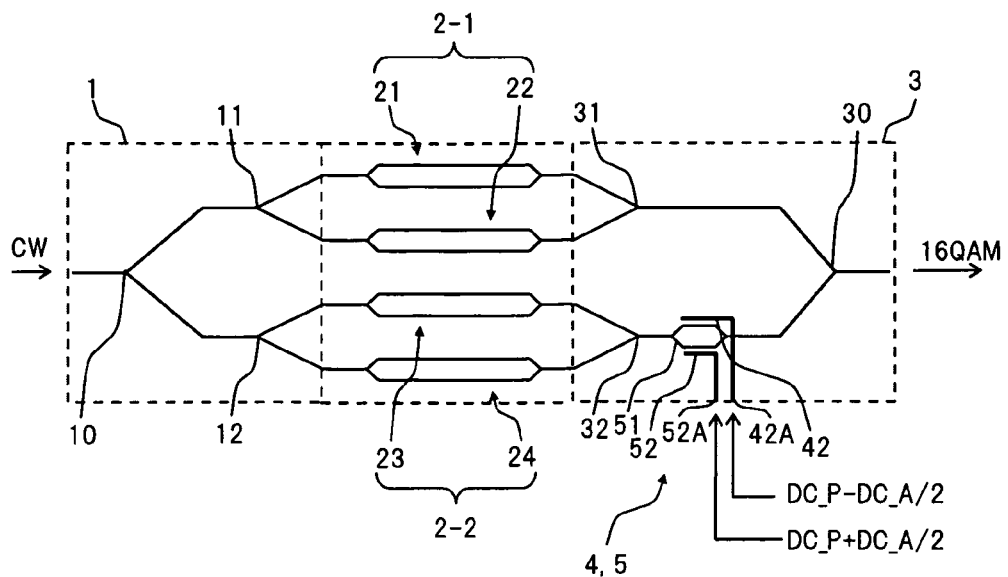
FIG. 3 is a diagram showing a main configuration of a first modification example associated with the configuration of FIG. 1.

FIG. 3 is a diagram showing a main configuration of a first modification example associated with the configuration of FIG. 1. In this first modification example, for the MZ interferometer 51 of the aforementioned optical power adjusting section 5, not only the electrode 52 is provided along one branch arm but also an electrode 42 is provided along the other branch arm, to form an adjusting terminal 42A by extending one end of the electrode 42 to the substrate edge. Moreover the aforementioned power ratio adjusting voltage DC_A is differentially applied to the adjusting terminals 42A and 52A of the respective electrodes 42 and 52 corresponding to the pair of branch arms of the MZ interferometer 51, and the phase difference adjusting voltage DC_P is applied to the adjusting terminals as a common mode voltage. That is, the applied voltage to the adjusting terminal 42A of the electrode 42 is designated as (DC_P−DC_A/2), and the applied voltage to the adjusting terminal 52A of the electrode 52 is designated as (DC_P+DC_A/2). As a result, the second coupled light passes through the MZ interferometer 51 to change the optical phase and the optical power, and the phase difference and the power ratio of the first and the second coupled lights can be respectively adjusted variably, thereby enabling to correct a deviation from the respective ideal states. That is, this gives a configuration where both functions of the optical phase adjusting section 4 and the optical power adjusting section 5 can be realized by the combination of the MZ interferometer 51 and the electrodes 42 and 52. In such a first modification example, since the electrode need not be provided along the optical path of the first coupled light, there is an advantage in that the loss on the first coupled light side is reduced.

Figure 4:
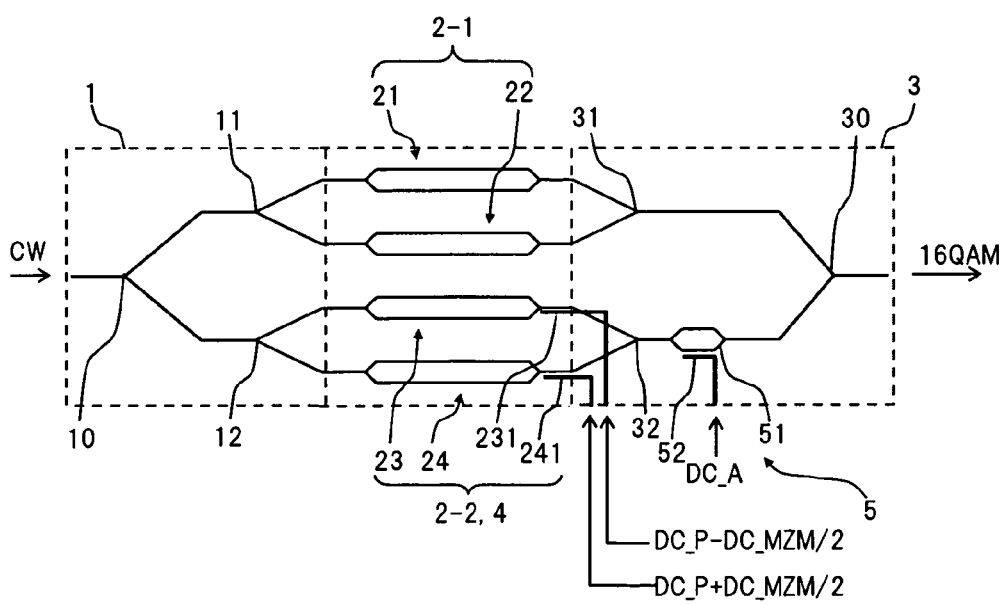
FIG. 4 is a diagram showing a main configuration of a second modification example associated with the configuration of FIG. 1.
Figure 5:
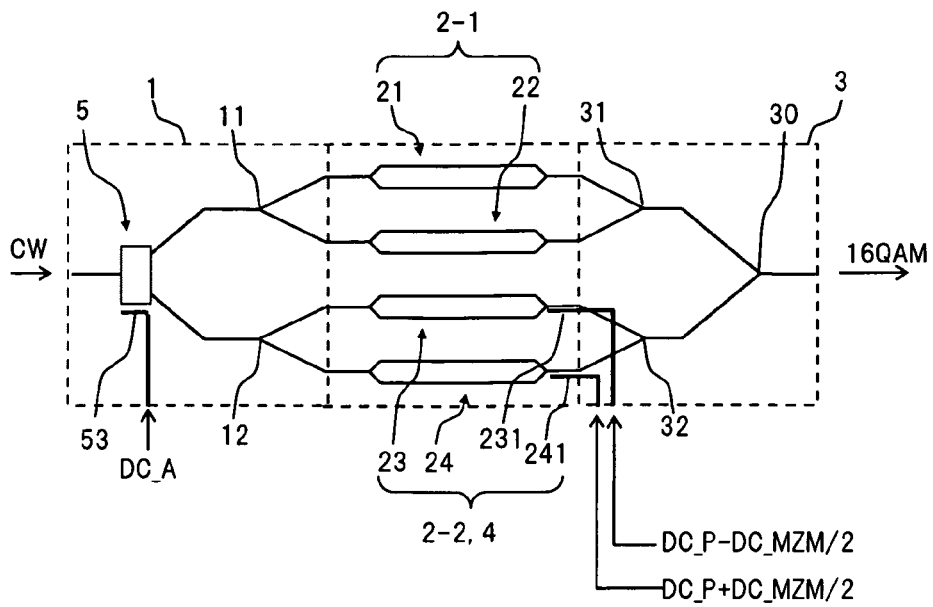
FIG. 5 is a diagram showing a main configuration corresponding to the second modification example in the configuration of FIG. 2.

FIG. 4 is a diagram showing a main configuration of a second modification example associated with the configuration of FIG. 1. In the second modification example, for the respective phase modulating sections 23 and 24 of the second phase modulation group 2-2, the function of the optical phase adjusting section 4 can be realized by using electrodes 231 and 241 for applying the MZ bias provided along the respective output waveguides. The electrodes 231 and 241 for applying the MZ bias are originally provided in the respective phase modulating sections 23 and 24, though not shown in FIG. 1, as the electrode to which a predetermined MZ bias voltage DC_MZM is differentially applied in order to orthogonalize phase changes of the carrier wave in the respective phase modulating sections 23 and 24. Therefore, the aforementioned phase difference adjusting voltage DC_P is applied to the electrodes 231 and 241 for applying the MZ bias, as the common mode voltage. That is, the applied voltage to the electrode 231 is designated as (DC_P−DC_MZM/2), and the applied voltage to the electrode 231 is designated as (DC_P+DC_MZM/2). As a result, since the optical phase of the second coupled light is changed in the optical coupling section 3 on a subsequent stage, the relative difference in the respective optical phases of the first and the second coupled lights can be adjusted variably, thereby enabling to correct a deviation from the ideal state of the phase difference. Also in the second modification example, since the electrode need not be provided along the optical path of the first coupled light, as in the case of the first modification example, there is an advantage in that the loss on the first coupled light side is reduced. Since the configuration of the second modification example is also effective for the configuration of FIG. 2, the main configuration in this case is shown in FIG. 5.

Figure 6:
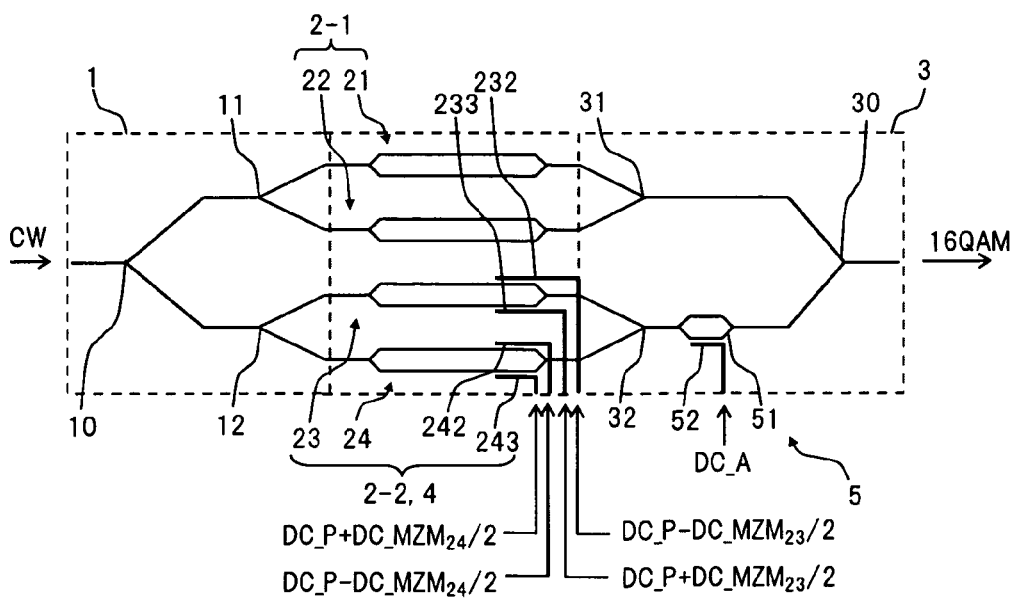
FIG. 6 is a diagram showing a main configuration of a third modification example associated with the configuration of FIG. 1.
Figure 7:
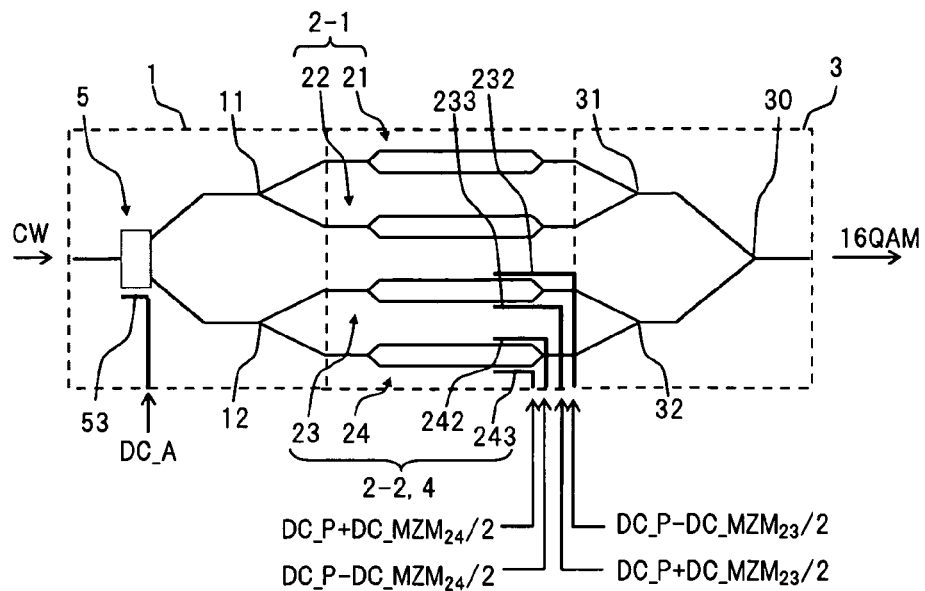
FIG. 7 is a diagram showing a main configuration corresponding to the third modification example in the configuration of FIG. 2.

FIG. 6 is a diagram showing a main configuration of a third modification example associated with the configuration of FIG. 1. In the third modification example, with regard to the aforementioned second phase modulation group 2-2, the function of the optical phase adjusting section 4 can be realized by using electrodes 232 and 233 for applying the MZ bias provided along the respective branch arms of the MZ interferometer in the phase modulating section 23 and electrodes 242 and 243 for applying the MZ bias provided along the respective branch arms of the MZ interferometer in the phase modulating section 24. Although the illustration of the electrodes 232 and 233 and the electrodes 242 and 243 for applying the MZ bias is omitted in FIG. 1 as in the case of the aforementioned second modification example, the electrodes 232 and 233 and the electrodes 242 and 243 are originally provided respectively in the phase modulating sections 23 and 24 as the electrodes, to which predetermined MZ bias voltages $DC\_MZM_{23}$ and $DC\_MZM_{24}$ are differentially applied, respectively, in order to orthogonalize the phase change of the carrier wave in the respective phase modulating sections 23 and 24. Therefore, the aforementioned phase difference adjusting voltage DC_P is applied to the electrodes 232 and 233 and the electrodes 242 and 243 for applying the MZ bias, as the common mode voltage. That is, the applied voltage to the electrode 232 is set to $(DC\_P-DC\_MZM_{23}/2)$, the applied voltage to the electrode 233 is set to $(DC\_P+DC\_MZM_{23}/2)$, the applied voltage to the electrode 242 is set to $(DC\_P-DC\_MZM_{24}/2)$, and the applied voltage to the electrode 243 is set to $(DC\_P+DC\_MZM_{24}/2)$. As a result, since the optical phase of the second coupled light is changed in the optical coupling section 3 on a subsequent stage, the relative difference in the respective optical phases of the first and the second coupled lights can be adjusted variably, thereby enabling to correct a deviation from the ideal state of the phase difference. Also in the third modification example, since the electrode need not be provided along the optical path of the first coupled light, as in the case of the first modification example, there is an advantage in that the loss on the first coupled light side is reduced. Since the configuration of the third modification example is also effective for the configuration of FIG. 2, the main configuration in this case is shown in FIG. 7.

In the third modification example, one example of using the electrode for applying the MZ bias included in the respective phase modulating sections 23 and 24 has been illustrated. However, the phase difference adjusting voltage DC_P can be applied to the electrode for applying a modulation signal (not shown) in the respective phase modulating sections 23 and 24, as the common mode voltage via a bias tee.

Moreover in the aforementioned first to the third modification examples, the configuration in which the optical phase adjusting section 4 and the optical power adjusting section 5 are provided on the second coupled light side has been illustrated. However, of course these can be provided on the first coupled light side.

Figure 8:
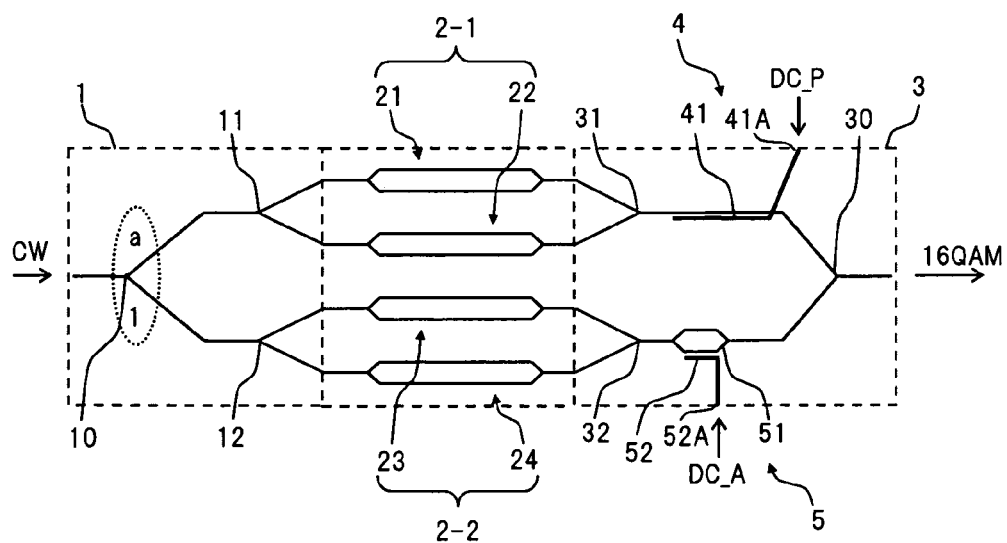
FIG. 8 is a diagram showing a main configuration of a fourth modification example associated with the configuration of FIG. 1.

FIG. 8 is a diagram showing a main configuration of a fourth modification example associated with the configuration of FIG. 1. In the fourth modification example, the branching ratio of the optical power at the optical branching point 10 in the optical branching section 1 is set to be asymmetric a:1, where a is fixed to a value of larger than 1 and smaller than 4 ($1<a<4$). In this configuration, the −6 dB fixed optical attenuator need not be arranged on the optical path on the aforementioned second phase modulation group 2-2 side. Moreover a setting range of the power ratio adjusting voltage DC_A in the optical power adjusting section 5 can be narrowed.

Figure 9:
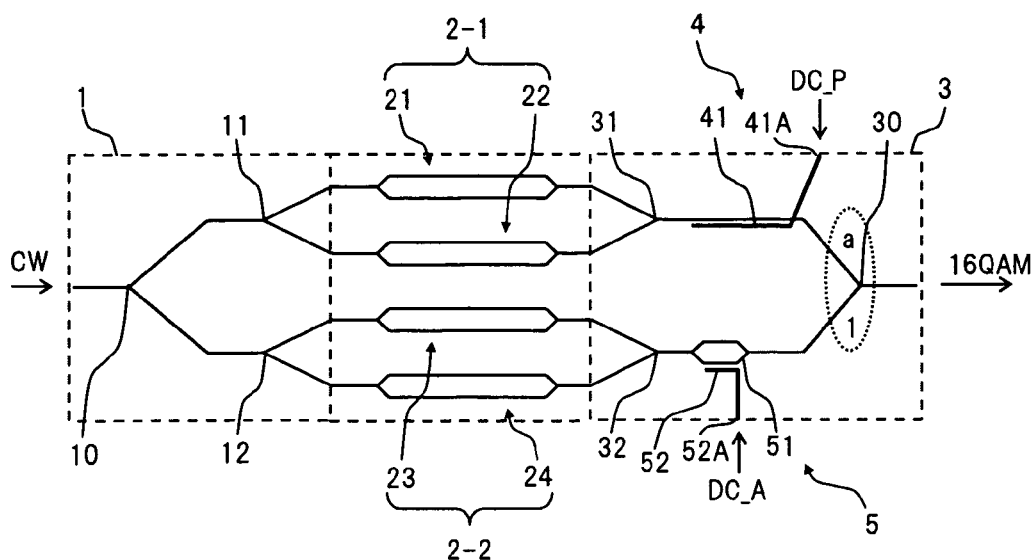
FIG. 9 is a diagram showing a main configuration of a fifth modification example associated with the configuration of FIG. 1.
Figure 10:
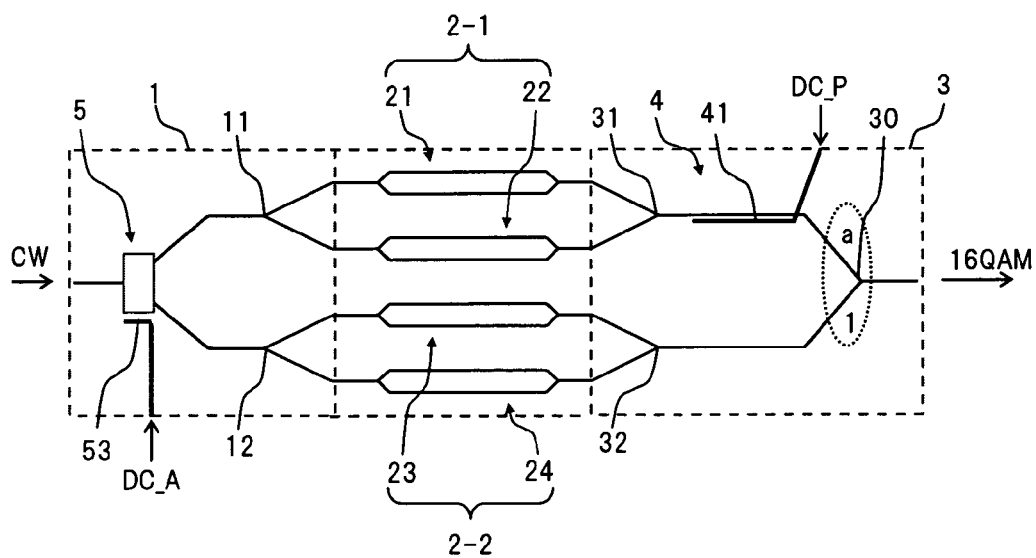
FIG. 10 is a diagram showing a main configuration corresponding to the fifth modification example in the configuration of FIG. 2.

FIG. 9 is a diagram showing a main configuration of a fifth modification example associated with the configuration of FIG. 1. In the fifth modification example, the coupling ratio of the optical power at the optical coupling point 30 in the optical coupling section 3 is set to be asymmetric a:1, where a is fixed to a value of larger than 1 and smaller than 4 ($1<a<4$). In this configuration, the −6 dB fixed optical attenuator need not be arranged on the optical path on the aforementioned second phase modulation group 2-2 side. Moreover the setting range of the power ratio adjusting voltage DC_A in the optical power adjusting section 5 can be narrowed. Since the configuration of the fifth modification example is also effective for the configuration of FIG. 2, the main configuration in this case is shown in FIG. 10.

Next is a description of control of the phase difference adjusting voltage DC_P and the power ratio adjusting voltage DC_A in the optical modulator of the embodiment.

Figure 11:
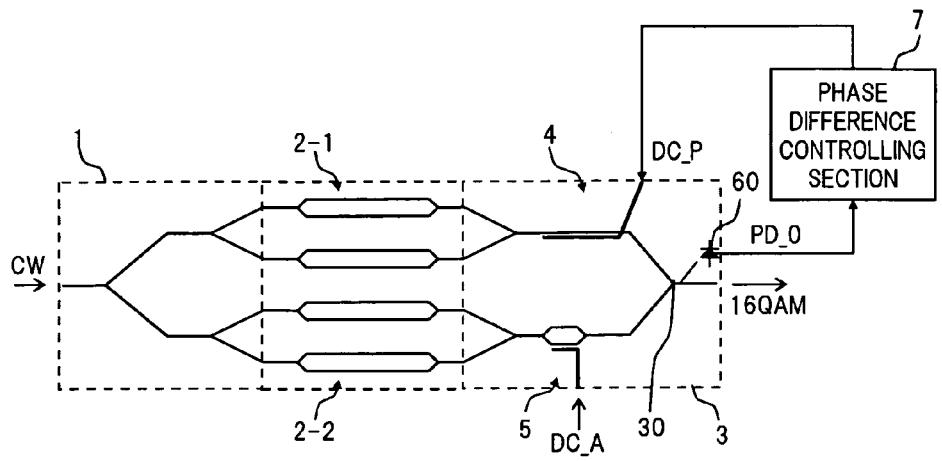
FIG. 11 is a diagram showing an apparatus configuration example for performing control of a phase difference adjusting voltage in the above embodiments.

FIG. 11 is a diagram showing an apparatus configuration example for performing control of the phase difference adjusting voltage DC_P with respect to the optical modulator (FIG. 1) in the embodiment. Since the same apparatus configuration can be applied to the control of the phase difference adjusting voltage DC_P in the respective modification examples shown in FIG. 2 to FIG. 10, the explanation corresponding to the respective modification examples is omitted. Moreover the control of the power ratio adjusting voltage DC_A is basically performed independently of the control of the phase difference adjusting voltage DC_P, and hence the explanation thereof is explained separately.

In the configuration example shown in FIG. 11, as an apparatus realizing the control of the phase difference adjusting voltage DC_P, there is provided; an optical monitoring section 60 arranged immediately after the optical coupling point 30 in the optical coupling section 3, and a phase difference controlling section 7 that feedback-controls the phase difference adjusting voltage DC_P so that the phase difference between the first and the second coupled lights is stabilized in the ideal state (n×90°) based on a monitoring result by the optical monitoring section 60.

The optical monitoring section 60 extracts the light coupled at the optical coupling point 30, that is, a part of the 16 QAM signal light, as a monitor light immediately after the optical coupling point 30, and receives the monitor light by using a general photoelectric transducer to output a photo current PD_0 changing corresponding to the power, to the phase difference controlling section 7. It is desired that the light to be input to the photoelectric transducer is a normal-phase monitor light obtained by branching a part of the signal light coupled once at the optical coupling point 30, from a viewpoint of control accuracy. However, due to a restriction of arrangement or the like, a reverse-phase output of the optical coupler used for the optical coupling point 30 can also be used as the monitor light. In this case, although control accuracy deteriorates as compared with the case of the normal-phase monitor light, an insertion loss of the optical monitoring section 60 can be reduced.

Power fluctuation of the 16 QAM signal light can be detected by using the photo current PD_0 output from the optical monitoring section 60. The power fluctuation depends on a bit pattern of a 16 QAM modulation traffic. However, since this bit pattern is an approximately complete random signal, the power fluctuation includes wide spectrum components of from a high frequency component of a coded modulation speed level to an extremely low speed component close to direct current. However, in the phase difference controlling section 7, since the feedback control of the phase difference adjusting voltage DC_P is performed based on the amount of power fluctuation of the monitor light according to a principle described later, only slight power of partial frequency components in the wide frequency range needs to be detected. Therefore, a small and inexpensive photodiode having a bandwidth of about 100 MHz, which can be easily incorporated, can be used as the photoelectric transducer used for the optical monitoring section 60.

Figure 12:
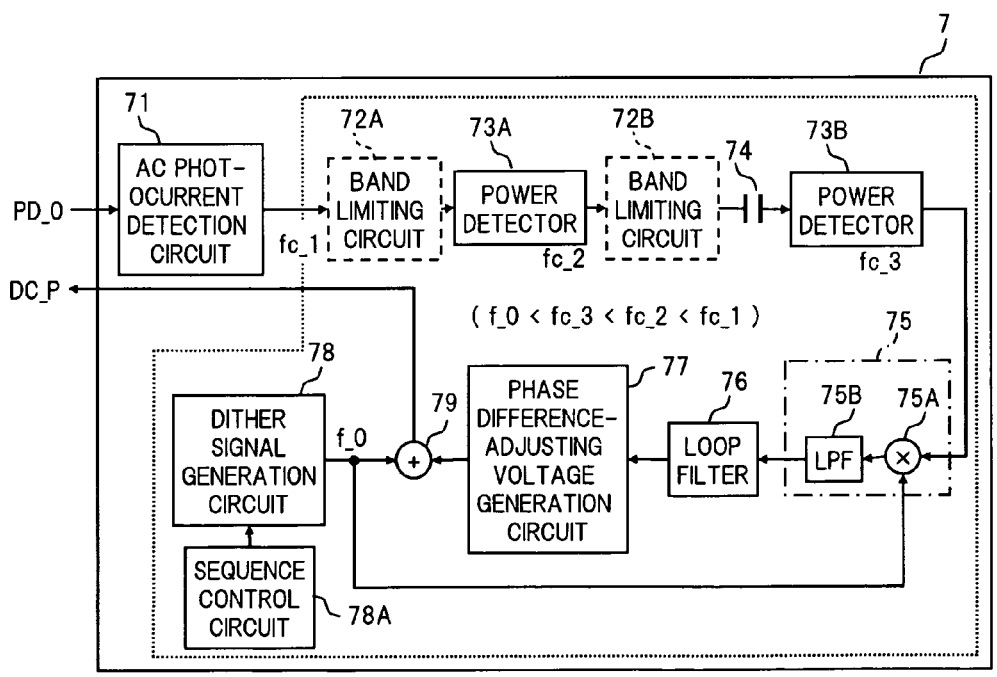
FIG. 12 is a block diagram showing a configuration example of a phase difference controlling section in FIG. 11.

FIG. 12 is a block diagram showing a specific configuration example of the phase difference controlling section 7. The phase difference controlling section 7 includes; an AC photocurrent detection circuit 71, first and second band limiting circuits 72A and 72B, first and second power detectors 73A and 73B, a capacitor (AC coupler) 74, a synchronization detection circuit 75, a loop filter 76, a phase difference-adjusting voltage generation circuit 77, a dither signal generation circuit 78, a sequence control circuit 78A, and an adder 79.

The photo current PD_0 output from the optical monitoring section 60 is input to the AC photocurrent detection circuit 71. The AC photocurrent detection circuit 71 then detects a fluctuation component (AC component) of the photo current PD_0 and outputs the detection signal to the band limiting circuit 72A. Here, the output band of the AC photocurrent detection circuit 71 is designated as fc_1.

The band limiting circuit 72A limits the bandwidth of the output signal from the AC photocurrent detection circuit 71 by using a band pass filter having a pass band in a range of from frequency f_L1 to frequency f_H1 (where f_L1<f_H1<fc_1). The band limiting circuit 72A can be omitted according to required control accuracy.

The power detector 73A detects the power of a signal that has passed through the band limiting circuit 72A, and outputs the detection signal to the band limiting circuit 72B. A power detector capable of fast response is used for the power detector 73A, and the output band thereof is here designated as fc_2 (where fc_2<fc_1).

The band limiting circuit 72B limits the bandwidth of the output signal from the power detector 73A by using a band pass filter having a pass band in a range of from frequency f_L2 to frequency f_H2 (where f_L2<f_H2<fc_2) or a high pass filter having a lower limit frequency of f_L2. The band limiting circuit 72B can also be omitted according to the required control accuracy. When the band pass filter is applied to the band limiting circuit 72B, the capacitor (AC coupler) 74 on the subsequent stage can be omitted.

The power detector 73B detects the power of a signal that has passed through the band limiting circuit 72B and outputs the detection signal to the synchronization detection circuit 75. Here, the output band of the power detector 73B is designated as fc_3. The output band fc_3 has a relation of f_0<fc_3<fc_2, where f_0 is the frequency of a dither signal output from the dither signal generation circuit 78.

The synchronization detection circuit 75 has a multiplication circuit 75A and a low pass filter (LPF) 75B. The multiplication circuit 75A multiplies an output signal of the power detector 73B by the dither signal output from the dither signal generation circuit 78. The LPF 75B removes the high frequency component of the output signal of the multiplication circuit 75A. In such a synchronization detection circuit 75, the dither signal component included in the output signal of the power detector 73B is extracted, and the signal is transmitted to the phase difference-adjusting voltage generation circuit 77 via the loop filter 76.

The phase difference-adjusting voltage generation circuit 77 generates the phase difference adjusting voltage DC_P, and also adjusts the phase difference adjusting voltage DC_P so that the level of the output signal from the loop filter 76 becomes a maximum. The dither signal of the frequency f_0 output from the dither signal generation circuit 78 is imparted to the phase difference adjusting voltage DC_P in the multiplication circuit 79 and output to the optical phase adjusting section 4. In other words, in the phase difference controlling section 7, maximum value detection of the power detected by the power detector 73B is performed by using a dithering method, and the feedback-control of the phase difference adjusting voltage DC_P is performed according to the result thereof.

The dither signal generation circuit 78 generates the dither signal of the frequency f_0 as described above, and ON/OFF control is performed by the sequence control circuit 78A. When the control by means of the maximum value detection using the dither signal is settled, the sequence control circuit 78A turns off the dither signal generation circuit 78, and turns on the dither signal generation circuit 78 at the point in time when adjustment of the phase difference adjusting voltage DC_P is required again, or at a required time interval. Furthermore when modulation control using another dither signal is performed in the respective phase modulating sections 21 to 24, the sequence control circuit 78A can control to turn off the dither signal generation circuit 78 so that the dither signal used in the phase difference controlling section 7 does not affect the modulation control.

A part of or all of the respective components of the phase difference controlling section 7 excluding the AC photocurrent detection circuit 71 enclosed by the dotted line in FIG. 12 can be realized by a digital circuit. In this case, an AD converter and a DA converter are provided as an input/output interface of the digital circuit.

Here the principle of the feedback control of the phase difference adjusting voltage DC_P performed by the phase difference controlling section 7 will be explained in detail.

Figure 25:
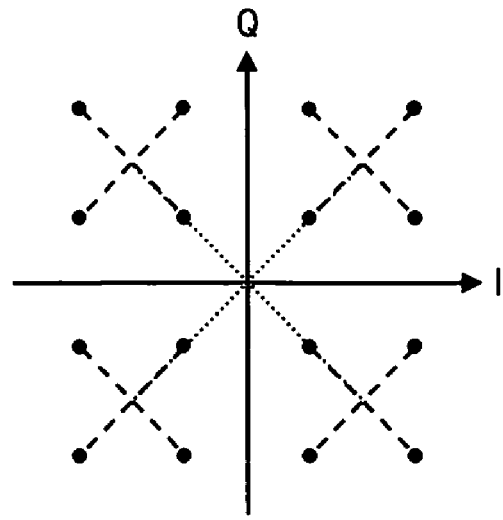
FIG. 25 is a diagram illustrating a change in the constellation of the 16 QAM signal light due to a deviation of phase difference.
Figure 25:
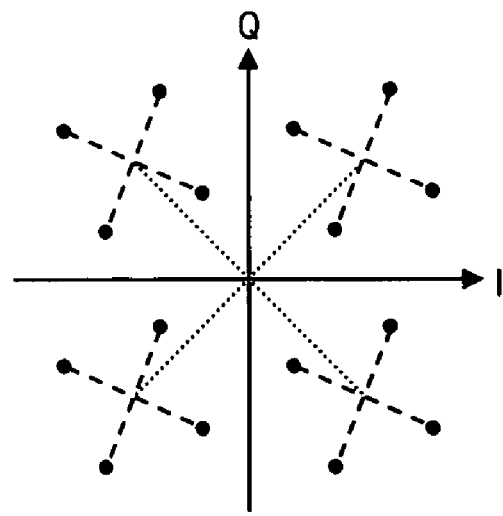
Figure 26:
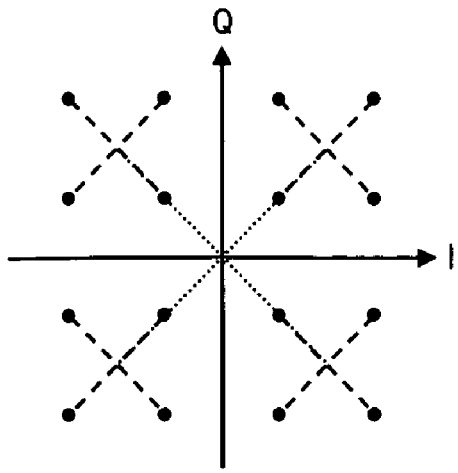
FIG. 26 is a diagram illustrating a change in the constellation of the 16 QAM signal light due to a deviation of power ratio.
Figure 26:
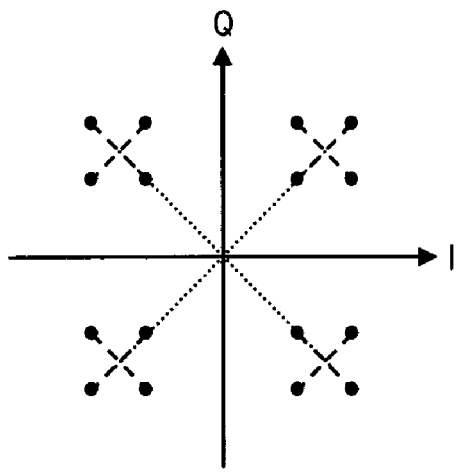
Figure 26:
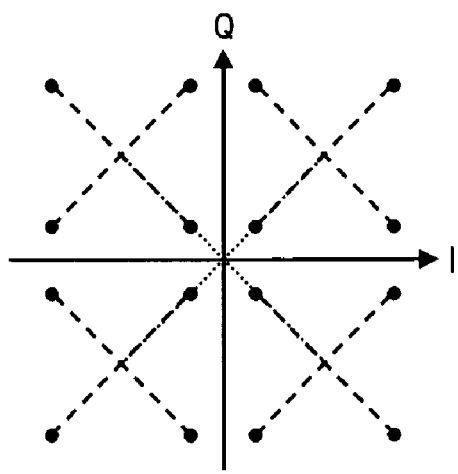

When the phase difference adjusting voltage DC_P deviates from the optimum value, a change occurs in the power of the respective symbols because the symbol arrangement of the 16 QAM signal light changes as shown in FIG. 25. That is, when the phase difference adjusting voltage DC_P has the optimum value and the phase difference is in the ideal state (see the upper part of FIG. 25), there are three types in the power of the respective symbols, and the power ratio is 1:5:9 in order close to the origin of the rectangular coordinate system in the constellation (in ascending order of power). In the power of the respective symbols, because the phase difference deviates from the ideal state (see the lower part of FIG. 25), the power of the symbol corresponding to "5" in the power ratio in the ideal state is divided into two types, and there are four types of power in total. If it is assumed that the phase difference deviates by x degrees from the ideal state, the power ratio of the respective symbols can be expressed by following expression (1).

$$1.25-\cos(x):1.25+\sin(x):1.25-\sin(x):1.25+\cos(x) \quad (1)$$

The respective terms in equation (1) are replaced as $a(x):b(x):c(x):d(x)$, to define parameters $e(x)$, $a\_1(x)$, $b\_1(x)$, $c\_1(x)$, $d\_1(x)$ shown below.

$$e(x)=\{a(x)+b(x)+c(x)+d(x)\}/4$$

$$a\_1(x)=\{a(x)-e(x)\}^2$$

$$b\_1(x)=\{b(x)-e(x)\}^2$$

$$c\_1(x)=\{c(x)-e(x)\}^2$$

$$d\_1(x)=\{d(x)-e(x)\}^2$$

The parameter $e(x)$, that is, a parameter corresponding to a mean value of $a(x)$, $b(x)$, $c(x)$, $d(x)$ corresponds to a DC component of the photo current PD_0 output from the optical monitoring section 60. Moreover when the parameters $a\_1(x)$, $b\_1(x)$, $c\_1(x)$, $d\_1(x)$ are arranged using the relation of expression (1), these become the following equation (2).

$$a\_1(x)=\cos^2(x)=0.5+0.5\times\cos(2x)$$

$$b\_1(x)=\sin^2(x)=0.5-0.5\times\cos(2x)$$

$$c\_1(x)=\sin^2(x)=0.5-0.5\times\cos(2x)$$

$$d\_1(x)=\cos^2(x)=0.5+0.5\times\cos(2x) \quad (2)$$

Moreover, the following parameters $f(x)$, $a\_2(x)$, $b\_2(x)$, $c\_2(x)$, and $d\_2(x)$ are defined.

$$f(x)=\{a\_1(x)+b\_1(x)+c\_1(x)+d\_1(x)\}/4$$

$$a\_2(x)=\{a\_1(x)-f(x)\}^2$$

$$b\_2(x)=\{b\_1(x)-f(x)\}^2$$

$$c\_2(x)=\{c\_1(x)-f(x)\}^2$$

$$d\_2(x)=\{d\_1(x)-f(x)\}^2$$

The parameter $f(x)$, that is, a parameter corresponding to a mean value of the previously defined four parameters $a\_1(x)$, $b\_1(x)$, $c\_1(x)$, $d\_1(x)$ corresponds to the power detected by the first power detector 73A in the configuration of the phase difference controlling section 7 shown in FIG. 12. Moreover when the newly defined parameters $a\_2(x)$, $b\_2(x)$, $c\_2(x)$, $d\_2(x)$ are arranged using the relation of equation (2), these become the following equation (3).

$$a\_2(x)=b\_2(x)=c\_2(x)=d\_2(x)=0.25\times\cos^2(2x) \quad (3)$$

Accordingly, a parameter $g(x)$ defined by the following equation (4), that is, a parameter corresponding to the mean value of parameters $a\_2(x)$, $b\_2(x)$, $c\_2(x)$, $d\_2(x)$ is a function of only x (deviation angle of phase difference), which does not depend on the modulation data. Also the parameter becomes a maximum when x=0.

$$g(x)=\{a\_2(x)+b\_2(x)+c\_2(x)+d\_2(x)\}/4= 0.25\times\cos^2(2x) \quad (4)$$

The parameter $g(x)$ corresponds to the power detected by the second power detector 73B in the configuration of the phase difference controlling section 7 shown in FIG. 12.

Therefore the dither signal is imparted to the phase difference adjusting voltage DC_P to perform maximum value detection of the detected power in the power detector 73B, and the feedback control of the phase difference adjusting voltage DC_P is performed according to the result thereof so that x=0, that is, the phase difference, can be stabilized in the ideal state.

One example where maximum value detection is performed by using the dithering method in the phase difference controlling section 7 has been illustrated. However, the method for detecting the maximum value of the detected power in the power detector 73B is not limited to the dithering method, and a known maximum value detection method can be used.

In the phase difference controlling section 7, it is noted that the power of the respective symbols of the 16 QAM signal light increases from three types to four types due to a deviation of the phase difference from the ideal state, and the phase difference adjusting voltage DC_P is optimized by using the two power detectors 73A and 73B. However, the optimization control of the phase difference in the present invention is not limited thereto. For example, when the phase difference adjusting voltage DC_P deviates from the optimum value, the symbol arrangement in the 16 QAM signal light fluctuates and the power of the symbol farthest from the origin of the rectangular coordinate system in the constellation decreases. Therefore, the power decrease of the symbol can be noted, and a peak of the photo current PD_0 output from the optical monitoring section 60 detected, to feedback-control the phase difference adjusting voltage DC_P so that the peak power becomes a maximum. The configuration example of the phase difference controlling section in this case is shown in FIG. 13.

Figure 13:
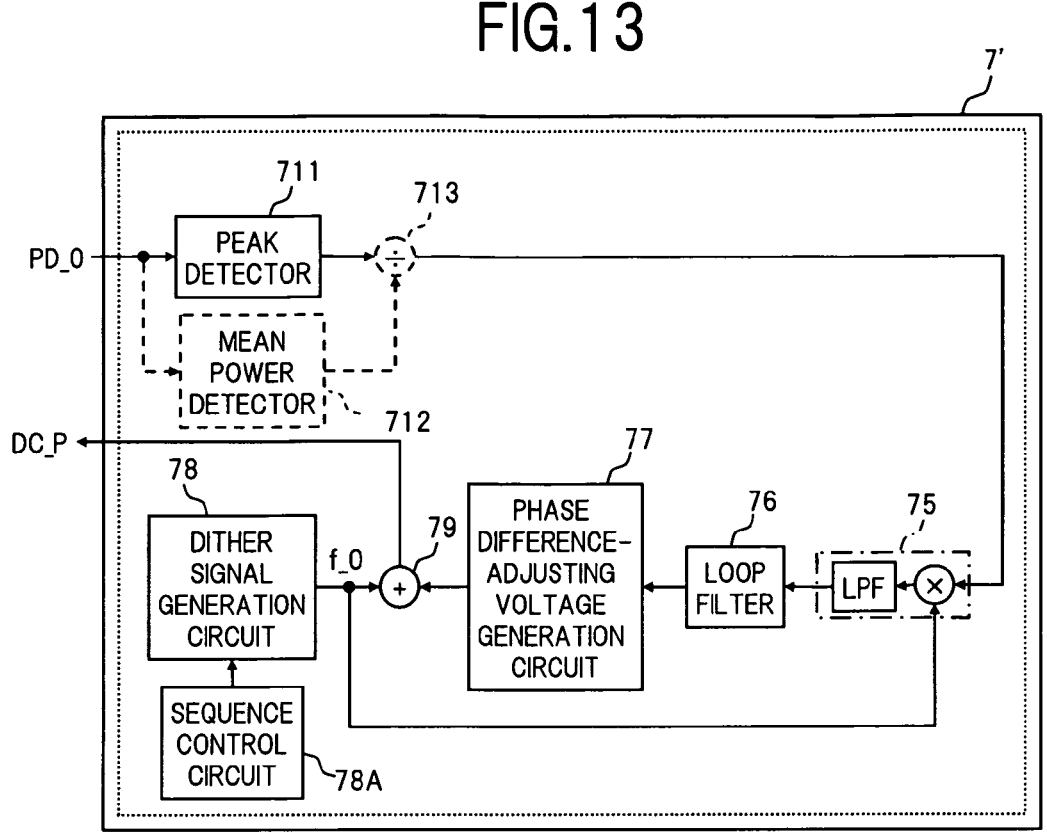
FIG. 13 is a block diagram showing another configuration example of the phase difference controlling section in FIG. 11.

In a phase difference controlling section 7' in FIG. 13, the photo current PD_0 output from the optical monitoring section 60 is input to a peak detector 711 to detect the peak power of the photo current PD_0. The peak detector 711 can be realized by using, for example, a peak detector corresponding to the high frequency signal. In this case, the photoelectric transducer used for the optical monitoring section 60 is required to have a reasonable fast response characteristic. For example, by applying an optical detector using two-photon absorption or saturable absorption to the optical monitoring section 60, the function corresponding to the peak detector 711 can be realized in the optical monitoring section 60.

A signal indicating the peak power of the photo current PD_0 detected by the peak detector 711 (or by the function corresponding thereto) is output to a synchronization detection circuit 75. The synchronization detection circuit 75, and the loop filter 76, the phase difference-adjusting voltage generation circuit 77, the dither signal generation circuit 78, the sequence control circuit 78A and the adder 79 connected to the subsequent stage thereof are the same as those in the aforementioned phase difference controlling section 7 of FIG. 12. That is, in the phase difference controlling section 7', the maximum value detection of the peak power of the photo current PD_0 detected by the peak detector 711 is performed by using the dithering method, and the feedback control of the phase difference adjusting voltage DC_P is performed according to the result thereof. The phase difference can also be stabilized in the ideal state by the phase difference controlling section 7'.

Moreover for the phase difference controlling section 7', a configuration can be adopted where an mean power detector 712 and a divider circuit 713 shown by the broken line in FIG. 13 are provided separately from the peak detector 711, and the mean power of the photo current PD_0 output from the optical monitoring section 60 is monitored by the mean power detector 712, and the peak power detected by the peak detector 711 is divided by the mean power and normalized. By adopting such a configuration, there is little influence of the peak fluctuation due to the optical power fluctuation or the like of the light source, thereby enabling to perform the feedback control of the phase difference adjusting voltage DC_P in a wide dynamic range. A part of or all of the respective components in the area enclosed by the dotted line in FIG. 13 can be realized by a digital circuit.

Next is a description of the control of the power ratio adjusting voltage DC_A in the optical modulator of the embodiment.

Figure 14:
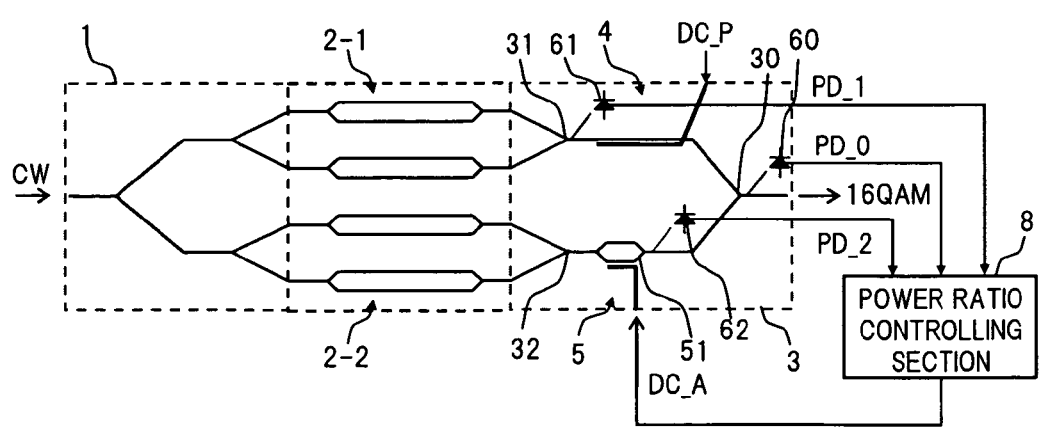
FIG. 14 is a diagram showing an apparatus configuration example for performing control of a power ratio adjusting voltage in the optical modulator of FIG. 1.
Figure 15:
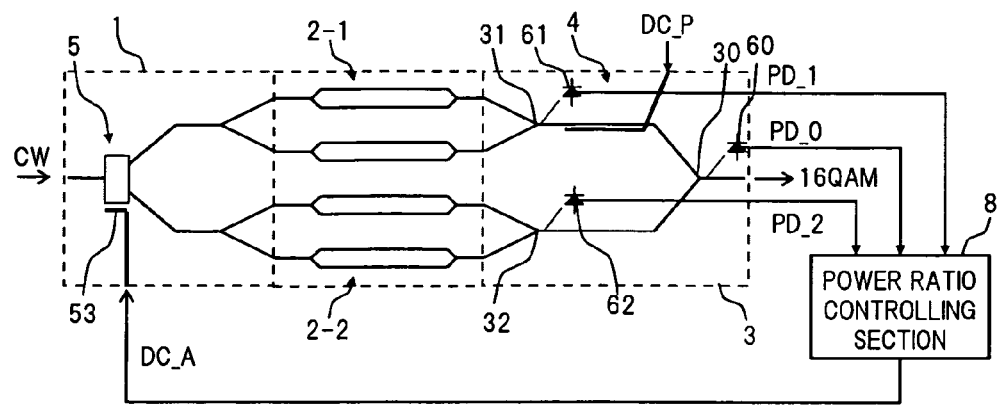
FIG. 15 is a diagram showing an apparatus configuration example for performing control of a power ratio adjusting voltage in the optical modulator of FIG. 2.

FIG. 14 is a diagram showing an apparatus configuration example for performing control of the power ratio adjusting voltage DC_A in the optical modulator shown in FIG. 1. Moreover FIG. 15 is a diagram showing an apparatus configuration example for performing control of the power ratio adjusting voltage DC_A in the optical modulator shown in FIG. 2. Since the same apparatus configuration can be applied to the control of the phase difference adjusting voltage DC_P in the respective modification examples shown in FIG. 3 to FIG. 10, explanation of the respective modification examples is omitted.

In the configuration examples of FIG. 14 and FIG. 15, as the apparatus for realizing control of the power ratio adjusting voltage DC-A, there is provided: an optical monitoring section 60 arranged immediately after the optical coupling point 30 in the optical coupling section 3; an optical monitoring section 61 arranged immediately after the optical coupling point 31; an optical monitoring section 62 arranged immediately after the MZ interferometer 51 in the optical power adjusting section 5 (FIG. 14) or immediately after the optical coupling point 32 in the optical coupling section 3 (FIG. 15); and a power ratio controlling section 8 that feedback-controls the power ratio adjusting voltage DC_A so that the power ratio of the aforementioned first and the second coupled lights is stabilized in the ideal state (4:1), based on the monitor results of the optical monitoring section 60 and the monitor results of either one of the optical monitoring sections 61 or 62.

The respective optical monitoring sections 60 to 62 have the same configuration as that of the aforementioned optical monitoring section 60 used for the feedback control of the phase difference, however, the position for extracting the monitor light in the optical monitoring sections 61 and 62 is changed from that in the optical monitoring section 60 as described above. Here, the photo currents respectively output from the respective optical monitoring sections 60, 61 and 62 to the power ratio controlling section 8 are designated as PD_0, PD_1 and PD_2.

Figure 16:
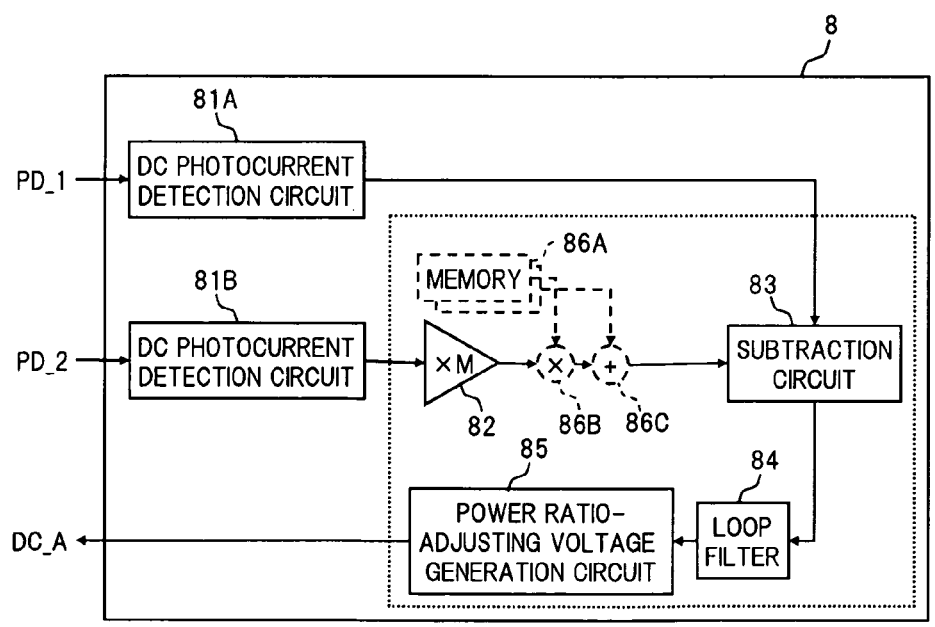
FIG. 16 is a block diagram showing a configuration example of a power ratio controlling section in FIG. 14 and FIG. 15.

FIG. 16 is a block diagram showing a specific configuration example of the power ratio controlling section 8. The power ratio controlling section 8 includes; DC photocurrent detection circuits 81A and 81B, an amplifier 82, a subtraction circuit 83, a loop filter 84, and a power ratio-adjusting voltage generation circuit 85. Moreover a nonvolatile memory 86A that stores an offset value determined by calibration at the time of product shipment or the like, and a multiplier circuit 86B and an adder circuit 86C for correcting an output signal of the amplifier 82 by using the offset value read from the memory 86A are appropriately provided therein. A part of or all of the respective components in an area enclosed by the dotted line in FIG. 16 can be realized by a digital circuit.

In the power ratio controlling section 8, it is noted that the power ratio of the first and the second coupled lights coupled at the optical coupling points 31 and 32 becomes 4:1 in the ideal state, and the respective mean values of the photo currents PD_1 and PD_2 output from the optical monitoring sections 61 and 62, that is, the DC components of the photo currents PD_1 and PD_2 are respectively detected by the DC photocurrent detection circuits 81A and 81B. In the configuration of FIG. 16, since the feedback control is performed by using the photo currents PD_1 and PD_2, the optical monitoring section 60 can be omitted.

Moreover the output signal of the DC photocurrent detection circuit 81B corresponding to the power ratio on the small side is amplified to M times by the amplifier 82. The magnification M of the amplifier 82 is determined, taking into consideration a coupling loss, a coupling ratio, or the like at the optical coupling points 31 and 32, and becomes M≈4 in the configuration of FIG. 16. Since the magnification M may be different in the individual optical modulators, an offset value of the magnification M is determined by the calibration performed at the time of product shipment or the like and stored in the memory 86A, and correction of the output of the amplifier 82 may be performed by using the offset value at the time of performing the feedback control.

The output signal of the amplifier 82 and the output signal of the DC photocurrent detection circuit 81A are input to the subtraction circuit 83 for subtraction, and the output signal of the subtraction circuit 83 is transmitted to the power ratio-adjusting voltage generation circuit 85 via the loop filter 84. The power ratio-adjusting voltage generation circuit 85 generates the power ratio adjusting voltage DC_A, and adjusts the power ratio adjusting voltage DC_A so that the voltage level of the output signal from the loop filter 84 approaches zero.

The power ratio of the first and the second coupled lights can be stabilized at 4:1 in the ideal state because of the feedback control of the power ratio adjusting voltage DC_A performed by the power ratio controlling section 8.

Figure 17:
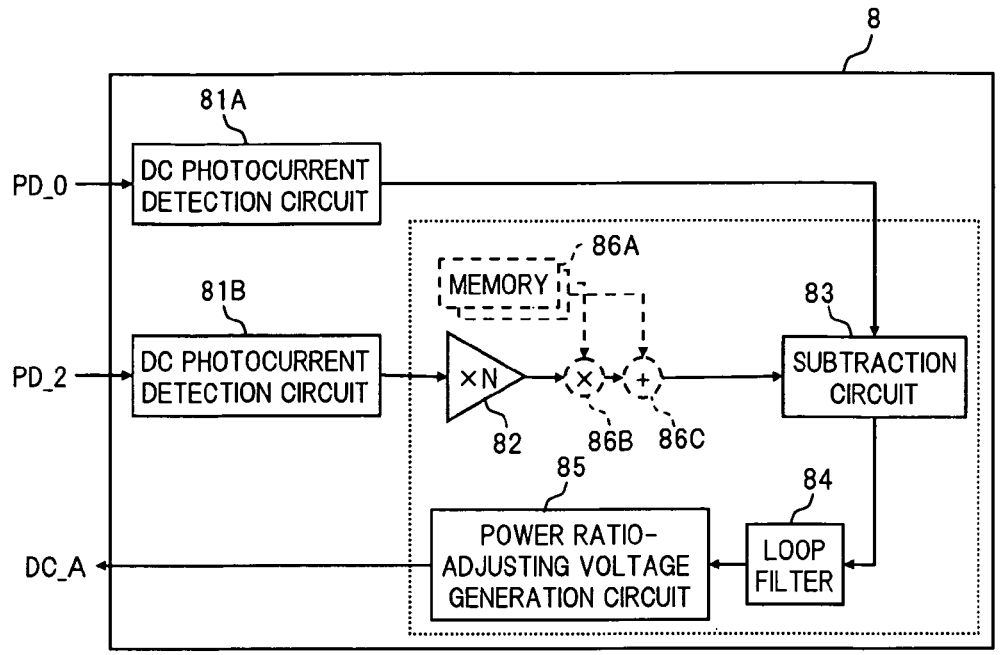
FIG. 17 is a block diagram showing another configuration example of the power ratio controlling section in FIG. 14 and FIG. 15.

In the power ratio controlling section 8 shown in FIG. 16, a configuration example is shown that monitors the mean values of the photo currents PD_1 and PD_2 output from the optical monitoring sections 61 and 62, to perform the feedback control. However, for example, as shown in FIG. 17, the mean values of the photo currents PD_0 and PD_2 output from the optical monitoring sections 60 and 62 may be monitored. In this case, regarding the magnification N of the amplifier 82, when the coupling ratio at the optical coupling point 30 is 1:1, an ideal insertion loss of the coupler is 3 dB, and hence the magnification N is desirably N≈5×2=10. In such a configuration, the optical monitoring section 61 can be omitted.

Figure 18:
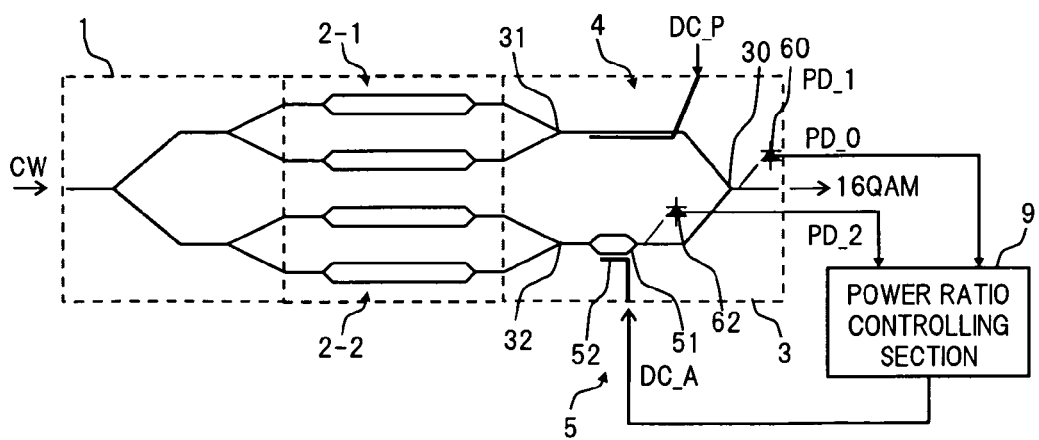
FIG. 18 is a diagram showing another apparatus configuration example for performing control of a power ratio adjusting voltage in the optical modulator of FIG. 1.

Moreover with regards to the configuration of the optical modulator (FIG. 1) in which the optical power adjusting section 5 is provided in the optical coupling section 3, the dither signal is imparted to the power ratio adjusting voltage DC_A, and the feedback control of the power ratio adjusting voltage DC_A can be performed based on the modulation component corresponding to the dither signal included in the monitored photo current. The apparatus configuration example in this case is shown in FIG. 18. Here the feedback control of the power ratio adjusting voltage DC_A is performed by a power ratio controlling section 9 using the photo currents PD_0 and PD_2 output from the optical monitoring sections 60 and 62.

Figure 19:
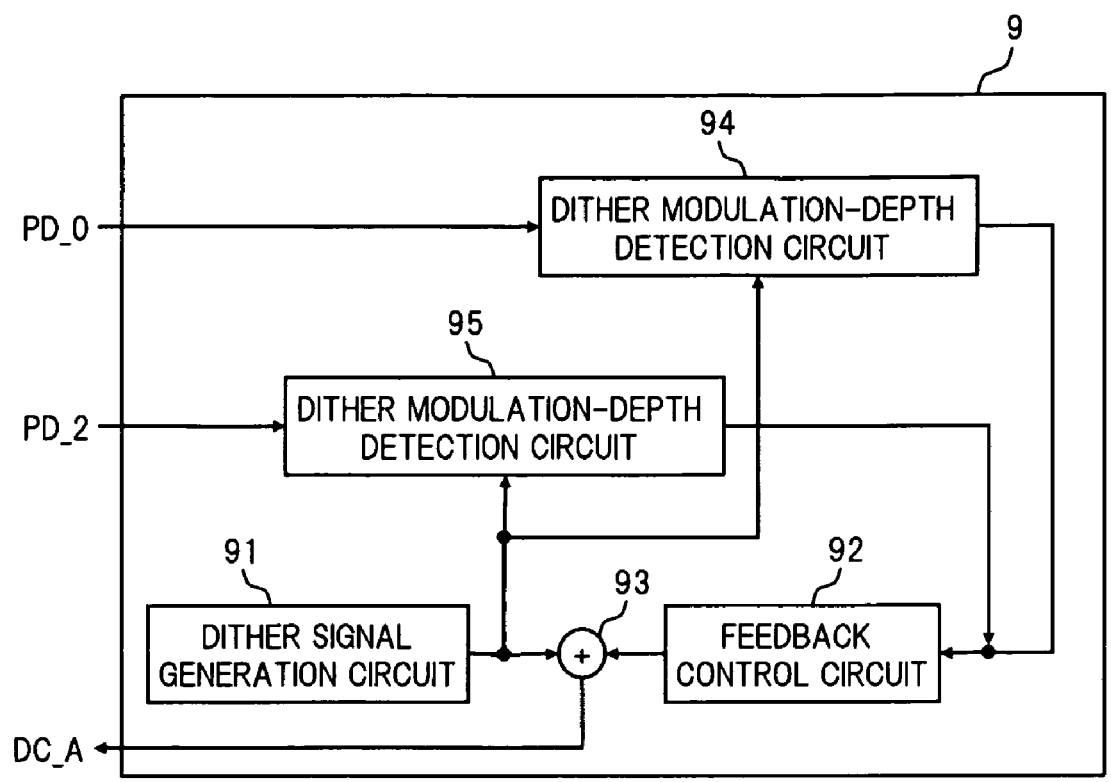
FIG. 19 is a block diagram showing a configuration example of the power ratio controlling section in FIG. 18.

In the power ratio controlling section 9, for example as shown in FIG. 19, the dither signal output from a dither signal generation circuit 91 is imparted to the power ratio adjusting voltage DC_A output from a feedback control circuit 92 in an adder circuit 93 and applied to the electrode 52 in the optical power adjusting section 5. As a result, the power of the second coupled light monitored by the optical monitoring section 62 and the power of the 16 QAM signal monitored by the optical monitoring section 60 respectively fluctuate according to the dither signal, and include the modulation component corresponding to the frequency of the dither signal. At this time, a ratio of a modulation depth by the dither signal between the photo currents PD_0 and PD_2 output from the optical monitoring sections 60 and 62 becomes 1:5 in the ideal state (when the optical power adjusting section 5 is arranged on the optical branching point 31 side, the ratio is 4:5), taking into consideration that the first coupled light coupled at the optical coupling point 31 is not affected by the dither signal. Therefore, the modulation depth of the respective photo currents PD_0 and PD_2 is monitored by dither modulation-depth detection circuits 94 and 95 provided corresponding to the respective photo currents PD_0 and PD_2, and optimization of the power ratio adjusting voltage DC_A is performed by the feedback control circuit 92 so that the monitoring result approaches the above ratio. As a result, the power ratio of the first and the second coupled lights can be stabilized at 4:1 in the ideal state.

Figure 20:
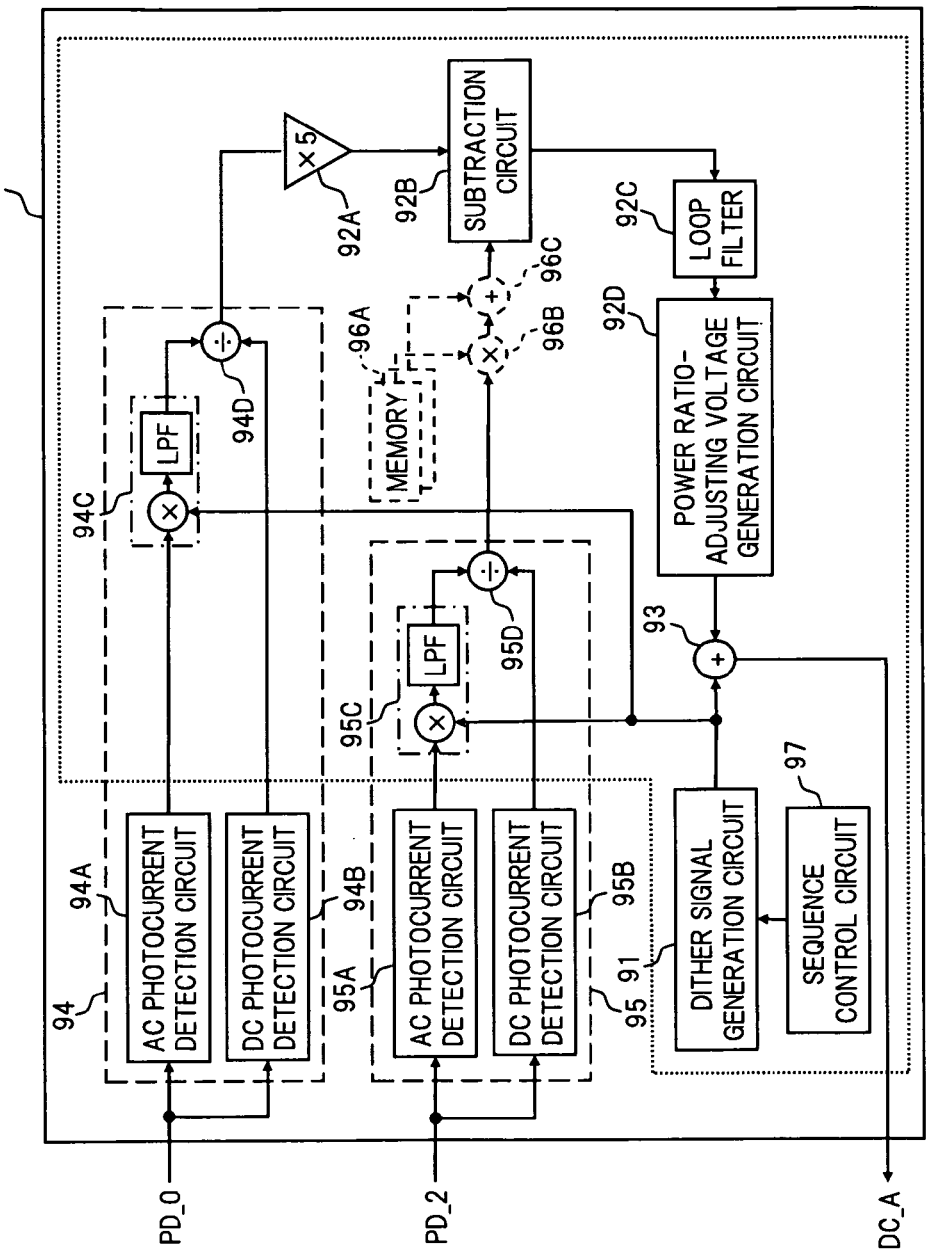
FIG. 20 is a block diagram showing a specific configuration example involved with the power ratio controlling section of FIG. 19.

FIG. 20 is a block diagram showing a specific configuration example associated with the power ratio controlling section 9 of FIG. 19. In this configuration example, the respective dither modulation-depth detection circuits 94 and 95 are constructed by using AC photocurrent detection circuits 94A and 95A, DC photocurrent detection circuits 94B and 95B, synchronization detection circuits 94C and 95C, and a divider circuit 94D and 95D, and a dither modulation depth is detected as a ratio between the AC component and the DC component derived from the dither signal, of the photo currents PD_0 and PD_2. Then after the output signal of the dither modulation-depth detection circuit 94 is amplified to 5 times by an amplifier 92A, the output signal of the amplifier 92A and the output signal of the dither modulation-depth detection circuit 95 undergo subtraction by a subtraction circuit 92B, and the output signal of the subtraction circuit 92B is transmitted to a power ratio-adjusting voltage generation circuit 92D via a loop filter 92C.

The ratio of 1:5 (or 4:5) of the dither modulation depth is just an ideal case, and actually, the ratio may deviate from the above numerical value due to the influence of an error of a circuit constant or a difference of drive performance in the respective phase modulating sections 21 to 24. Therefore, the offset value is determined by the calibration performed at the time of product shipment or the like and stored in the memory 96A, and correction of the output signal of the dither modulation-depth detection circuit 95 may be performed by using the offset value at the time of performing the feedback control. A part of or all of the respective components in the area enclosed by the dotted line in FIG. 20 can be realized by a digital circuit.

Next is a description of an extension of the present invention to an optical modulator according to a $4^N$ QAM system.

In the aforementioned embodiment of the optical modulator and the modification examples thereof, and in the feedback control of the phase difference adjusting voltage DC_P and the power ratio adjusting voltage DC_A in the optical modulator, explanation has been made by illustrating a configuration example in which four phase modulating sections 21 to 24 are connected in parallel to generate the 16 QAM signal light. However, the present invention is applicable not only to the optical modulator of the 16 QAM system, but also to the optical modulator of the $4^N$ QAM system. In the explanation below, N is designated as an integer equal to or larger than 2.

Figure 21:
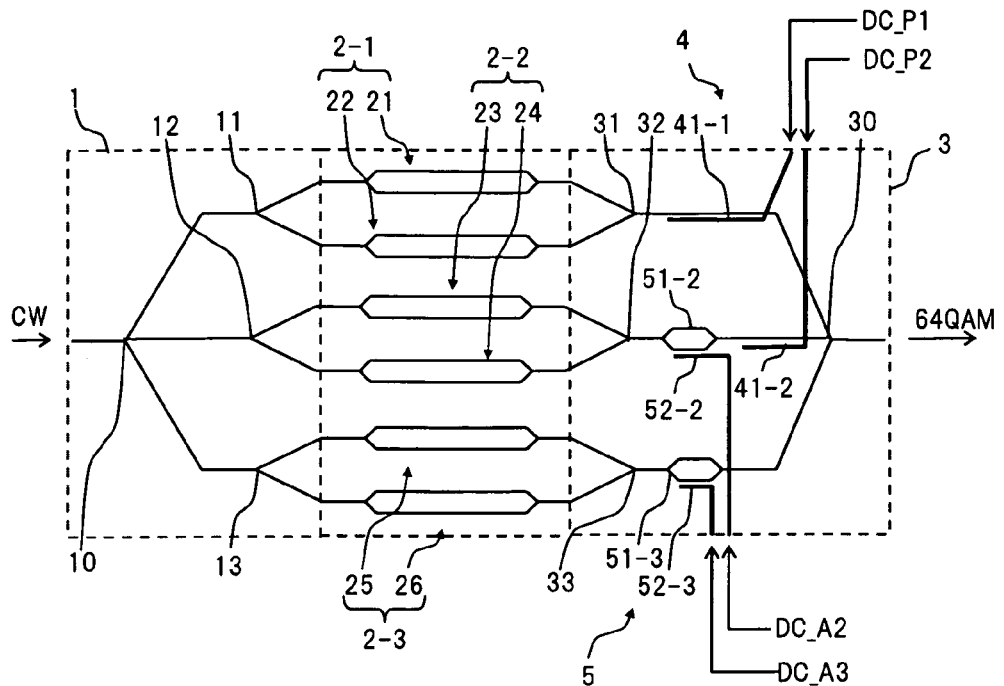
FIG. 21 is a diagram showing a configuration example of an optical modulator of a 64 QAM system according to the present invention.

FIG. 21 is a diagram showing a configuration example of an optical modulator of a 64 (=$4^3$) QAM system applied to the present invention. In this optical modulator, a CW light provided from the outside is branched into 2×N, that is 2×3=6 lights by the optical branching section 1. Here after the input light to the optical branching section 1 is branched into three at the optical branching point 10 on the first stage, the respective branched lights are branched respectively into two at the optical branching points 11, 12 and 13 on the second stage, so that the lights branched into six are guided to corresponding output ports, respectively.

Phase modulating sections 21 to 26 are respectively connected to each output port of the optical branching section 1. The respective phase modulating sections 21 to 26 are the same as the phase modulating section used for the aforementioned 16 QAM system. Here the six phase modulating sections 21 to 26 connected in parallel are divided into; a first phase modulation group 2-1 in which the phase modulating sections 21 and 22 on the first and the second stages in FIG. 21 are designated as a pair, a second phase modulation group 2-2 in which the phase modulating sections 23 and 24 on the third and the fourth stages are designated as a pair, and a third phase modulation group 2-3 in which the phase modulating sections 25 and 26 on the fifth and the sixth stages are designated as a pair. The operation of the respective phase modulation groups 2-1 to 2-3 is set so that phase shifts of the carrier wave in the respective paired phase modulating sections are orthogonal to each other. Moreover, this gives a configuration where a fixed optical attenuator (not shown) or a required optical attenuation is provided in the optical power adjusting section 5 on the subsequent stage, so that the power ratio of the modulated light output from the respective phase modulation groups 2-1 to 2-3 occupying the output light becomes 16:4:1 (=$4^2:4^1:4^0$).

The output lights of the respective phase modulating sections 21 to 26 are respectively input to the six input ports of the optical coupling section 3. The optical coupling section 3 couples the input lights from the phase modulating sections 21 and 22 with the power ratio of 1:1 at the optical coupling point 31 to generate the first coupled light, couples the input lights from the phase modulating sections 23 and 24 with the power ratio of 1:1 at the optical coupling point 32 to generate the second coupled light, and couples the input lights from the phase modulating sections 25 and 26 with the power ratio of 1:1 at the optical coupling point 33 to generate the third coupled light. Moreover, the optical coupling section 3 couples the first to the third coupled lights with a required power ratio (here, designated as 1:1:1) at the optical coupling point 30 to generate the 64 QAM signal light, and outputs the 64 QAM signal light to the outside from the output port. Here it is assumed that the optical waveguide of the pattern as shown in the figure is formed on a substrate material having an electro-optic effect to create the optical coupling section 3.

Electrodes 41-1 and 41-2 of the optical phase adjusting section 4 are formed on the optical path between the optical coupling points 31 and 30 and the optical path between the optical coupling points 32 and 30 in the optical coupling section 3, and phase difference adjusting voltages DC_P1 and DC_P2 are applied to an adjusting terminal formed by extending one end of the respective electrodes 41-1 and 41-2 to the substrate edge. Due to the optical phase adjusting section 4, a relative difference in the respective optical phases of the first to the third coupled lights can be adjusted variably, thereby enabling to correct a deviation from the ideal state of the phase difference (n×90°). The optimization control of the respective phase difference adjusting voltages DC_P1 and DC_P2 can be realized by applying the feedback control of the phase difference adjusting voltage DC_P in the aforementioned 16 QAM system. Specifically, for example, with regard to the configuration of the phase difference controlling section 7 shown in FIG. 12, the feedback control of the phase difference adjusting voltages DC_P1 and DC_P2 corresponding to the 64 QAM system can be realized by increasing the number of cascade stages of the power detector from two stages to three stages. Alternatively, the configuration of the phase difference controlling section 7 shown in FIG. 13 can basically be directly applied.

Furthermore MZ interferometers 51-2 and 51-3 and electrodes 52-2 and 52-3 of the optical power adjusting section 5 are formed on the optical path between the optical coupling points 32 and 30 and the optical path between the optical coupling points 33 and 30 of the optical coupling section 3, and power ratio adjusting voltages DC_A2 and DC_A3 are applied to an adjusting terminal formed by extending one end of the respective electrodes 52-2 and 52-3 to the substrate edge. Due to the optical power adjusting section 5, the power ratio of the first to the third coupled lights can be adjusted variably, thereby enabling to correct a deviation of the power ratio from the ideal state (16:4:1). The optimization control of the respective power ratio adjusting voltages DC_A2 and DC_A3 can be realized by applying the feedback control of the power ratio adjusting voltage DC_A in the aforementioned 16 QAM system. Specifically, for example, with regard to the configuration of the power ratio controlling section 9 shown in FIG. 9, the dither modulation-depth detection circuits respectively corresponding to the second and the third coupled lights passing through the respective MZ interferometers 51-2 and 51-3 of the optical power adjusting section 5 are provided. Furthermore the ratio between the dither modulation depth of the monitor photo current of the 64 QAM signal light and the dither modulation depth of the monitor photo current of the second coupled light is designated as 4:21 when the dither signal is imparted to the power ratio adjusting voltage DC_A2. Moreover the ratio between the dither modulation depth of the monitor photo current of the 64 QAM signal light and the dither modulation depth of the monitor photo current of the third coupled light is designated as 1:21 when the dither signal is imparted to the power ratio adjusting voltage DC_A3. As a result, the feedback control of the power ratio adjusting voltages DC_A2 and DC_A3 corresponding to the 64 QAM system can be realized.

Figure 22:
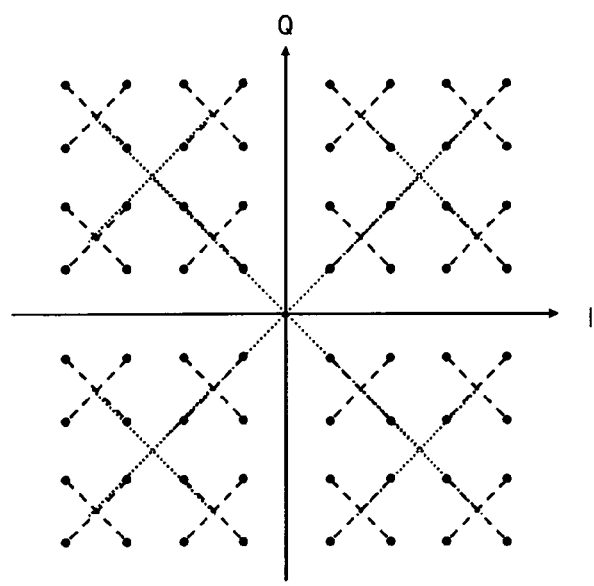
FIG. 22 is a diagram showing a constellation of a 64 QAM signal light.

The constellation of the 64 QAM signal light obtained by such an optical modulator becomes a symbol arrangement as shown in FIG. 22 in a state with the feedback control of the phase difference adjusting voltages DC_P1 and DC_P2 and the power ratio adjusting voltages DC_A2 and DC_A3 being stabilized.

Figure 23:
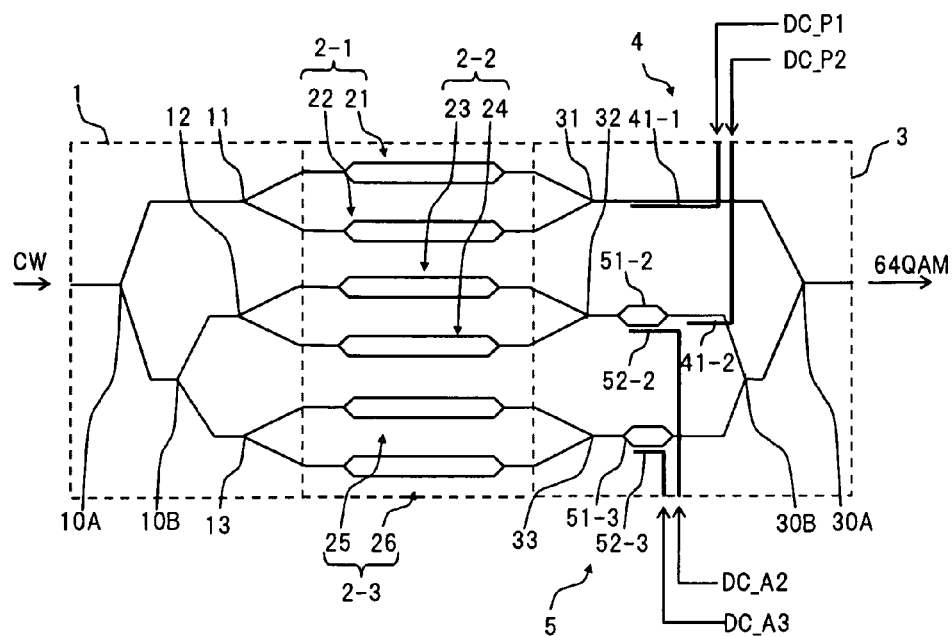
FIG. 23 is a diagram showing another configuration example related to the optical modulator of FIG. 21.

The optical power adjusting section 5 of the 64 QAM optical modulator can be realized by making the branching ratio variable at the optical branching point 10 in the optical branching section 1 as in the aforementioned case of FIG. 2. Moreover the configuration the same as the respective modification examples shown in FIG. 3 to FIG. 10 can be applied to the 64 QAM optical modulator. Furthermore for example, modification of the optical branching section 1 and the optical coupling section 3 as shown in FIG. 23 is also possible. In this modification example, the light input to the optical branching section 1 is first branched into two by an optical branching section 10A. Then one of the branched lights is branched into two at an optical branching point 11 and output to the phase modulating sections 21 and 22. The other of the branched lights is branched into two at an optical branching point 10B, and then further branched into two at the optical branching points 12 and 13 and output to the phase modulating sections 23 to 26. A configuration symmetrical to the optical branching section 1 is applied to the optical coupling section 3. By using the optical branching section 1 and the optical coupling section 3, in the phase modulating section of the six phase modulating sections 21 to 26 in which the insertion loss needs to be decreased (phase modulating sections 21 and 22 in the example in the figure), the number of the optical branching points and the optical coupling points through which the input light and the output lights pass can be reduced relatively. As a result, the insertion loss in the entire optical modulator can be reduced.

Figure 24:
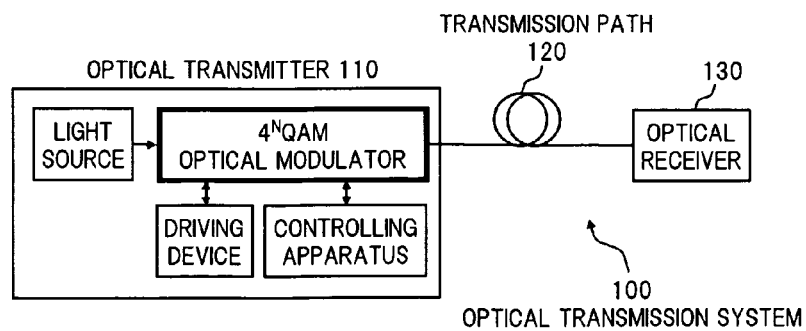
FIG. 24 is a diagram showing one example of an optical transmitter and an optical transmission system using the optical modulator of the present invention.

For example, an optical transmitter 110 as shown in FIG. 24 can be constructed by using the aforementioned optical modulator of the $4^N$ QAM system, and further, an optical transmission system 100 that transfers the $4^N$ QAM signal light transmitted from the optical transmitter 110 between the optical transmitter 110 and an optical receiver 130 via a transmission path 120 can be constructed. According to the optical transmitter 110 and the optical transmission system 100, the high-quality $4^N$ QAM signal light can be transmitted at a high speed.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical modulator that performs quadrature amplitude modulation with respect to an input light and outputs the quadrature amplitude modulated light, comprising:
   an optical branching section that branches an input light into (2×N) lights (where N is an integer equal to or larger than 2);
   (2×N) phase modulating sections that respectively modulate the phase of respective lights branched by the optical branching section;
   an optical coupling section that couples the phase-modulated lights output from the respective phase modulating sections and outputs quadrature amplitude modulated signal light having a $4^N$ value; and
   an optical phase adjusting section that relatively adjusts, with respect to an optical phase of specific two phase-modulated lights of the phase-modulated lights output from the respective phase modulating sections, the optical phase of the remaining (2×N−2) phase-modulated lights.

2. An optical modulator according to claim 1, wherein the optical coupling section couples the phase modulated lights output from the respective phase modulating sections into a set of two and generates N coupled lights, and then couples the respective coupled lights into one and outputs quadrature amplitude modulated signal light having a $4^N$ value,
   and the optical phase adjusting section adjusts the optical phase of at least (N−1) coupled lights of the N coupled lights.

3. An optical modulator according to claim 2, wherein the optical power adjusting section has a substrate having an electro-optic effect, and a waveguide formed on the substrate, and
   the optical phase adjusting section has an electrode provided along a waveguide part through which the at least (N−1) coupled lights of the N coupled lights propagate, and an adjusting terminal for applying a bias voltage to the electrode to change a phase of the light propagating through the waveguide part.

4. An optical modulator according to claim 2, wherein the (2×N) phase modulating sections each have; a substrate having an electro-optic effect, a waveguide formed on the substrate, and an electrode provided along the waveguide,
   and the optical phase adjusting section applies a bias voltage to the electrode of a phase modulating section that corresponds to the at least (N−1) coupled lights of the N coupled lights, to thereby adjust an optical phase of the N coupled lights.

5. A controlling method for an optical modulator according to claim 1, comprising:
   a step for monitoring a power of the quadrature amplitude modulated signal light having a $4^N$ value output from the optical coupling section; and
   a step for detecting a difference in the optical phase of the remaining (2×N−2) phase-modulated lights with respect to the optical phase of the specific two phase-modulated lights, based on timewise fluctuation characteristics of the monitored power of the quadrature amplitude modulated signal light having a $4^N$ value, and feedback controlling the optical phase adjusting section so that the difference of the optical phases approaches a predetermined target value.

6. A controlling method according to claim 5, wherein:
   the step for monitoring the power photoelectrically converts the quadrature amplitude modulated signal light having a $4^N$ value output from the optical coupling section, and generates a photoelectric current corresponding to the optical power,
   and the step for feedback controlling the optical phase adjusting section performs a power detection operation N times in a cascade manner with a timewise fluctuation component of the generated photoelectric current as an input, and feedback controls the optical phase adjusting section so that the power detection value becomes a maximum.

7. A controlling method according to claim 5, wherein:
   the step for feedback controlling the optical phase adjusting section detects a peak value of the monitored power of the quadrature amplitude modulated signal light having a $4^N$ value, and feedback controls the optical phase adjusting section so that the peak power becomes a maximum.

8. A controlling method according to claim 7, wherein:
   the step for feedback controlling the optical phase adjusting section detects a mean value of the monitored power of the quadrature amplitude modulated signal light having a $4^N$ value, and normalizes the peak power with the mean power and performs feedback control of the optical phase adjusting section.

9. A controlling apparatus for an optical modulator according to claim 1, comprising:
   an optical monitoring section that monitors a power of the quadrature amplitude modulated signal light having a $4^N$ value output from the optical coupling section; and
   a phase difference controlling section that detects a difference in the optical phase of the remaining (2×N−2) phase-modulated lights with respect to the optical phase of the specific two phase-modulated lights, based on timewise fluctuation characteristics of the power of the quadrature amplitude modulated signal light having a $4^N$ value monitored by the optical monitoring section, and feedback controls the optical phase adjusting section so that the difference of the optical phases approaches a predetermined target value.

10. A controlling apparatus according to claim 9, wherein:
the optical monitoring section has a photoelectric transducer that photoelectrically converts the quadrature amplitude modulated signal light having a $4^N$ value output from the optical coupling section, and generates a photoelectric current corresponding to the optical power,
and the phase difference controlling section has; a detection circuit that detects a timewise fluctuation component of the photoelectric current output from the photoelectric transducer, a high-order power detector that performs a power detection operation N times in a cascade manner with a signal output from the detection circuit as an input, and a control circuit that feedback controls the optical phase adjusting section so that the power detection value in the high-order power detector becomes a maximum.

11. A controlling apparatus according to claim 9, wherein:
the phase difference controlling section has; a peak detector that detects a peak value of the power of the quadrature amplitude modulated signal light having a $4^N$ value monitored by the optical monitoring section, and a control circuit that feedback controls the optical phase adjusting section so that the peak power detected by the peak detector becomes a maximum.

12. A controlling apparatus according to claim 11, wherein:
the phase difference controlling section has; a mean power detector that detects a mean value of the power of the quadrature amplitude modulated signal light having a $4^N$ value monitored by the optical monitoring section, and the control section normalizes the peak power detected by the peak detector with the mean power detected by the mean power detector and performs feedback control of the optical phase adjusting section.

13. An optical transmitter that includes the optical modulator according to claim 1.

14. An optical transmitter according to claim 13 comprising; a light source that generates input light for the optical modulator, a driving device that drives the optical modulator, and a controlling apparatus wherein the controlling apparatus includes an optical monitoring section that monitors a power of the quadrature amplitude modulated signal light having a $4^N$ value output from the optical coupling section; and a phase difference controlling section that detects a difference in the optical phase of the remaining (2×N−2) phase-modulated lights with respect to the optical phase of the specific two phase-modulated lights, based on timewise fluctuation characteristics of the power of the quadrature amplitude modulated signal light having a $4^N$ value monitored by the optical monitoring section, and feedback controls the optical phase adjusting section so that the difference of the optical phases approaches a predetermined target value.

15. An optical transmission system that includes the optical transmitter according to claim 13.

16. An optical modulator that performs quadrature amplitude modulation with respect to an input light and outputs the quadrature amplitude modulated light, comprising:
an optical branching section that branches an input light into (2×N) lights (where N is an integer equal to or larger than 2);
(2×N) phase modulating sections that respectively modulate the phase of respective lights branched by the optical branching section;
an optical coupling section that couples the phase-modulated lights output from the respective phase modulating sections and outputs quadrature amplitude modulated signal light having a $4^N$ value; and
an optical power adjusting section that adjusts a ratio of the power of specific two phase-modulated lights of the phase-modulated lights output from the respective phase modulating sections, with respect to the power of the quadrature amplitude modulated signal light having a $4^N$ value output from the optical coupling section.

17. An optical modulator according to claim 16, wherein the optical coupling section couples the phase modulated lights output from the respective phase modulating sections into a set of two and generates N coupled lights, and then couples the respective coupled lights into one and outputs quadrature amplitude modulated signal light having a $4^N$ value,
and the optical phase adjusting section adjusts the optical phase of at least (N−1) coupled lights of the N coupled lights.

18. An optical modulator according to claim 17, wherein the optical power adjusting section has a variable optical attenuator provided on an optical path through which the at least (N−1) coupled lights of the N coupled lights propagate, and an adjusting terminal to which is applied a signal for adjusting an optical attenuation amount in the variable optical attenuator.

19. An optical modulator according to claim 17, wherein the optical power adjusting section has an optical absorption area provided on an optical path through which the at least (N−1) coupled lights of the N coupled lights propagate, and an adjusting terminal to which is applied a signal for adjusting an absorption ratio in the optical absorption area.

20. An optical modulator according to claim 17, wherein the optical power adjusting section has a variable optical amplifier provided on an optical path through which the at least (N−1) coupled lights of the N coupled lights propagate, and an adjusting terminal to which is applied a signal for adjusting a gain in the variable optical amplifier.

21. An optical modulator according to claim 17, wherein the optical power adjusting section has an optical device that makes a branching ratio of input light in the optical branching section variable, and an adjusting terminal to which is applied a signal for adjusting the branching ratio of the optical device.

22. An optical modulator according to claim 17, wherein the optical power adjusting section has an optical device that makes a coupling ratio for when the N coupled lights in the optical coupling section are coupled into one variable, and an adjusting terminal to which is applied a signal for adjusting the coupling ratio of the optical device.

23. A controlling method for an optical modulator according to claim 16, comprising:
a step for monitoring a power of the quadrature amplitude modulated signal light having a $4^N$ value output from the optical coupling section, and monitoring a power of phase modulated light output from the phase modulating sections; and
a step for feedback controlling the optical power adjusting section so that a ratio of the monitor power of the quadrature amplitude modulated signal light having a $4^N$ value, and the monitor power of specific two phase-modulated lights of the phase modulated lights output from the respective phase modulating sections, approaches a predetermined target value.

24. A controlling method according to claim 23, wherein the step for feedback controlling the optical power adjusting section feedback controls the optical power adjusting section so that a ratio of the monitor power of the specific two phase-modulated lights of the phase modulated lights output from the respective phase modulating sections, and the monitor power of the remaining (2×N−2) phase-modulated lights approaches a predetermined target value.

25. A controlling method for an optical modulator according to claim 16, comprising:
a step for applying a dither signal to the optical power adjusting section, and generating a modulation component corresponding to a frequency of the dither signal for the power of the specific two phase modulated lights;
a step for monitoring a power of the quadrature amplitude modulated signal light having a $4^N$ value output from the optical coupling section and monitoring a power of the specific two phase modulated lights; and
a step for detecting a depth of a dither modulation component contained in each of the monitor power of the quadrature amplitude modulated signal light having a $4^N$ value and the monitor power of the specific two phase modulated lights, and feedback controlling the optical power adjusting section so that a ratio of the depths approaches a predetermined target value.

26. A controlling apparatus for an optical modulator according to claim 16, comprising:
an optical monitoring section that monitors a power of the quadrature amplitude modulated signal light having a $4^N$ value output from the optical coupling section, and monitors a power of phase modulated light output from the phase modulating sections; and
a power ratio control section that feedback controls the optical power adjusting section so that a ratio of the monitor power monitored in the optical monitoring section, of the quadrature amplitude modulated signal light having a $4^N$ value, and the monitor power of the specific two phase-modulated lights of the phase modulated lights output from the respective phase modulating sections, approaches a predetermined target value.

27. A controlling apparatus according to claim 26, wherein the power ratio control section feedback controls the optical power adjusting section so that a ratio of the monitor power of the specific two phase-modulated lights of the phase modulated lights output from the respective phase modulating sections, and the monitor power of the remaining (2×N−2) phase-modulated lights approaches a predetermined target value.

28. A controlling apparatus for an optical modulator according to claim 16, comprising:
a dither signal generating section that applies a dither signal to the optical power adjusting section, and generates a modulation component corresponding to a frequency of the dither signal for the power of the specific two phase modulated lights;
an optical monitoring section that monitors a power of the quadrature amplitude modulated signal light having a $4^N$ value output from the optical coupling section and monitors the power of the specific two phase modulated lights; and
a power ratio control section that detects a depth of a dither modulation component contained in each of the monitor power of the quadrature amplitude modulated signal light having a $4^N$ value and the monitor power of the specific two phase modulated lights, monitored by the optical monitoring section, and feedback controls the optical power adjusting section so that a ratio of the depths approaches a predetermined target value.

29. An optical transmitter that includes the optical modulator according to claim 16.

30. An optical transmitter according to claim 29 comprising; a light source that generates input light for the optical modulator, a driving device that drives the optical modulator, and a controlling apparatus wherein the controlling apparatus includes an optical monitoring section that monitors a power of the quadrature amplitude modulated signal light having a $4^N$ value output from the optical coupling section, and monitors a power of phase modulated light output from the phase modulating sections; and a power ratio control section that feedback controls the optical power adjusting section so that a ratio of the monitor power monitored in the optical monitoring section, of the quadrature amplitude modulated signal light having a $4^N$ value, and the monitor power of the specific two phase-modulated lights of the phase modulated lights output from the respective phase modulating sections, approaches a predetermined target value.

31. An optical transmission system that includes the optical transmitter according to claim 29.

* * * * *